US011893363B2

(12) United States Patent
Drain et al.

(10) Patent No.: US 11,893,363 B2
(45) Date of Patent: Feb. 6, 2024

(54) UNIT TEST CASE GENERATION WITH TRANSFORMERS

(71) Applicant: MICROSOFT TECHNOLOGY LICENSING, LLC., Redmond, WA (US)

(72) Inventors: Dawn Drain, Bellevue, WA (US); Neelakantan Sundaresan, Bellevue, WA (US); Alexey Svyatkovskiy, Bellevue, WA (US); Michele Tufano, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 516 days.

(21) Appl. No.: 17/080,843

(22) Filed: Oct. 27, 2020

(65) Prior Publication Data

US 2022/0066747 A1 Mar. 3, 2022

Related U.S. Application Data

(60) Provisional application No. 63/071,335, filed on Aug. 27, 2020.

(51) Int. Cl.
| | |
|---|---|
| *G06F 9/44* | (2018.01) |
| *G06F 8/35* | (2018.01) |
| *G06F 17/18* | (2006.01) |
| *G06N 3/084* | (2023.01) |
| *G06N 3/088* | (2023.01) |
| *G06N 5/046* | (2023.01) |

(52) U.S. Cl.
CPC ............ *G06F 8/35* (2013.01); *G06F 17/18* (2013.01); *G06N 3/084* (2013.01); *G06N 3/088* (2013.01); *G06N 5/046* (2013.01)

(58) Field of Classification Search
None
See application file for complete search history.

(56) References Cited

U.S. PATENT DOCUMENTS

| | | | | |
|---|---|---|---|---|
| 2018/0336884 | A1* | 11/2018 | Sriram | G06N 3/044 |
| 2021/0182489 | A1* | 6/2021 | Barkan | G06N 3/08 |
| 2021/0264109 | A1* | 8/2021 | Srinivasan | G06F 40/44 |
| 2021/0279577 | A1* | 9/2021 | West | G06N 3/045 |
| 2021/0286598 | A1* | 9/2021 | Luo | G06N 3/084 |

(Continued)

OTHER PUBLICATIONS

Xu set al., CN106557413, Eng text (Year: 2017).*

(Continued)

*Primary Examiner* — Insun Kang

(57) ABSTRACT

A unit test generation system employs a neural transformer model with attention to generate candidate unit test sequences given a focal method of a programming language. The neural transformer model is pre-trained with source code programs and natural language text and fine-tuned with mapped test case pairs. A mapped test case pair includes a focal method and a unit test case for the focal method. In this manner, the neural transformer model is trained to learn the semantics and statistical properties of a natural language, the syntax of a programming language and the relationships between the code elements of the programming language and the syntax of a unit test case.

14 Claims, 17 Drawing Sheets

(56) References Cited

U.S. PATENT DOCUMENTS

2021/0407679 A1* 12/2021 Liu .................. G06N 3/088
2022/0004365 A1* 1/2022 Pujar ................ G06N 3/088

OTHER PUBLICATIONS

Song et al., CN111078895, Eng text (Year: 2020).*
"International Search Report and Written Opinion Issued in PCT Application No. PCT/US21/032841", dated Sep. 14, 2021, 10 Pages.
Svyatkovskiy, et al., "IntelliCode Compose: Code Generation Using Transformer", In Repository of arXiv:2005.08025v1, May 16, 2020, 15 Pages.
"Cactus", Retrieved from: http://jakarta.apache.org/cactus/, Retrieved Date: Oct. 7, 2020, 02 Pages.
"JUnit 5", Retrieved from: https://junit.org/junit5/, Retrieved Date: Oct. 7, 2020, 04 Pages.
"Methods2test", Retrieved from: https://github.com/microsoft/methods2test, Retrieved Date: Oct. 9, 2020, 05 Pages.
"Mockito". Retrieved from https://site,mockito.org/, Retrieved Date: Oct. 7, 2020, 06 Pages.
"TestNG", Retrieved from: https://testng.org/doc/, Retrieved Date: Oct. 7, 2020, 03 Pages.
"Tree-sitter", Retrieved from: http://tree-sitter.github.io/tree-sitter/, Retrieved Date: Oct. 7, 2020, 02 Pages.
"Utilizing Fast Testing to Transform Java Development into an Agile, Quick Release, Low Risk Process", In Whitepaper of Agitar Technologies, 2020, 05 Pages.
Almasi, et al., "An Industrial Evaluation of Unit Test Generation: Finding Real Faults in a Financial Application", In Proceedings of IEEE/ACM 39th International Conference on Software Engineering: Software Engineering in Practice Track, May 20, 2017. pp. 263-272.
Brown, et al., "Language Models are Few-Shot Learners", In Journal of Computing Research Repository, May 28, 2020, 72 Pages.
Chen, et al., "SEQUENCER: Sequence-to-Sequence Learning for End-to-End Program Repair", In Journal of IEEE Transactions on Software Engineering. Sep. 10, 2019, 17 Pages.
Cohn, Mike, "Succeeding with Agile Software Development Using Scrum", In Publication of Pearson Education, 2010, 503 Pages.
Daka, et al., "Modeling Readability to Improve Unit Tests", In Proceedings of the 2015 10th Joint Meeting on Foundations of Software Engineering, Aug. 30, 2015, pp. 107-118.
Devlin, et al., "BERT: Pre-training of Deep Bidirectional Transformers for Language Understanding", In Journal of Computing Research Repository, Oct. 11, 2018, 14 Pages.
Fraser, et al., "EvoSuite: Automatic Test Suite Generation for Object-Oriented Software", In Proceedings of the 19th ACM SIGSOFT Symposium and the 13th European conference on Foundations of Software Engineering, Sep. 5, 2011, pp. 416-419.
Gokaslan, et al., "OpenWebText Corpus", Retrieved from:http://Skylion007.github.io/OpenWebTextCorpus. 2019, 3 Pages.
Grano et al.. "An Empirical Investigation on the Readability of Manual and Generated Test Cases", In Proceedings of IEEE/ACM 26th international Conference on Program Comprehension, May 27, 2018, pp. 348-351.
Grano, et al., "Scented Since the Beginning On the Diffuseness of Test Smells in Automatically Generated Test Code", In Journal of Systems and Software, vol. 156, Oct. 2019, 20 Pages.
Hu, et al., "Deep Code Comment Generation", In Proceedings of IEEE/ACM 26th International Conference on Program Comprehension, May 27, 2018, pp. 200-210.
Husain, et al., "CodeSearchNet Challenge: Evaluating the State of Semantic Code Search", In Journal of Computing Research Repository, Sep. 20, 2019, 6 Pages.
Lewis, et al., "BART: Denoising Sequence-to-Sequence Pre-training for Natural Language Generation, Translation. and Comprehension", In Journal of Computing Research Repository, Oct. 29, 2019, 10 Pages.
Liu, et al., "RoBERTa: A Robustly Optimized BERT Pretraining Approach", In Journal of Computing Research Repository, Jul. 26, 2019, 13 Pages.
Pacheco, et al., "Randoop: Feedback-Directed Random Testing for Java", In Proceedings of the 22nd ACM SIGPLAN Conference on Object Oriented Programming Systems and Applications Companion, Oct. 21, 2007, pp. 815-816.
Palomba, et al., "Automatic Test Case Generation: What If Test Code Quality Matters?", In Proceedings of the 25th International Symposium on Software Testing and Analysis, Jul. 18, 2016, pp. 130-141.
Palomba, et al., "On the Diffusion of Test Smells in Automatically Generated Test Code: An Empirical Study", In Proceedings of IEEE/ACM 9th International Workshop on Search-Based Software Testing, May 16, 2016, pp. 5-14.
Pinto, et al., "A Multi-Objective Genetic Algorithm to Test Data Generation", In Proceedings of 22nd IEEE International Conference on Tools with Artificial Intelligence, Oct. 27, 2010, pp. 129-134.
Press, et al., "Using the Output Embedding to Improve Language Models" , In Journal of Computing Research Repository, Aug. 20, 2016, 06 Pages.
Radford, et al., "Language Models Are Unsupervised Multitask Learners", Published in OpenAI Blog, vol. 1, Issue 8, Feb. 24, 2019, 24 Pages.
Raffel, et al., "Exploring The Limits of Transfer Learning with a Unified Text-To-Text Transformer", In Journal of Computing Research Repository, Oct. 23, 2019, 52 Pages.
Shamshiri, Sina, "Automated Unit Test Generation for Evolving Software", In Proceedings of the 2015 10th Joint Meeting on Foundations of Software Engineering, Aug. 30, 2015, pp. 1038-1041.
Svyatkovskiy, et al., "Pythia: AI-assisted Code Completion System", In Proceedings of the 25th ACM SIGKDD International Conference on Knowledge Discovery & Data Mining, Aug. 4, 2019, pp. 2727-2735.
Tufano, et al., "An Empirical Study on Learning Bug-Fixing Patches in the Wild via Neural Machine Translation.", In Proceedings of ACM Transactions on Software Engineering and Methodology, Sep. 2, 2019, 29 Pages.
Vaswani, et al., "Attention Is All You Need" In Journal of Computing Research Repository, Jun. 12, 2017, 15 Pages.
Watson, et al., "On Learning Meaningful Assert Statements for Unit Test Cases", In Journal of Computing Research Repository, Feb. 13, 2020, 12 Pages.

* cited by examiner

UNIT TEST CASE GENERATION WITH TRANSFORMERS

CROSS-REFERENCE TO RELATED APPLICATIONS

The present application claims the benefit of the earlier filed U.S. Provisional Application having Ser. No. 63/071,335 filed on Aug. 27, 2020, which is incorporated by reference herein in its entirety.

BACKGROUND

Software testing is a critical phase of software development and is often one of the most time consuming, challenging, and expensive phases of the software development lifecycle. Automated testing is often used to run a tool that carries out the execution of test cases automatically to produce test results without any human intervention. Automated testing saves the time and effort of the developers from manually testing the code and helps validate the functionality of a program (i.e., application, software, product, source code, code) before it is released into production.

There are different levels of testing that may be performed before a software product is released. Unit testing checks the individual software modules of a program (e.g., method or class) in isolation without any interaction with dependencies to ensure that the source code modules operate as intended. Integration testing is where individual modules or components are combined and tested as a group to ensure that the interaction between the different modules does not have any faults. Functional testing checks the entire program's functionality with all the source code components executing together.

The generation of unit tests automatically reduces the time and expense of software testing. However, the automated unit tests need to meet the needs of the developers and generate correct and readable unit tests.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A unit test case generation system generates a unit test for a focal method (i.e., a method to be tested) using a neural transformer model with attention. The neural transformer model with attention automatically predicts the statements of a unit test case of a specific programming language needed to test the operation of a method of a programming language. The neural transformer model with attention is trained through transfer learning which integrates source code and natural language text (e.g., English). The neural transformer model with attention is pre-trained on a large corpus of unsupervised natural language text in order to learn the semantics and statistical properties of the natural language. The neural transformer model with attention is then pre-trained on a large corpus of unsupervised source code methods from a target programming language in order to learn the syntax of the programming language and the relationships between the code elements of the programming language.

The neural transformer model with attention is then fine-tuned on mapped unit test case pairs, $mtc_i = \{tc_i, fm_i\}$, where $mtc_i$ represents a mapping of a unit test case, $tc_i$, to a focal method, $fm_i$, in order to learn to translate an input sequence consisting of a focal method to an output sequence consisting of a unit test case. Fine-tuning the neural transformer model with attention with a supervised training dataset is a translation task with a training objective that learns a mapping of a focal method to a unit test case, $fm_i \rightarrow tc_i$, as a conditional probability $P(tc_i, fm_i)$.

In this manner, the neural transformer model with attention is able to capture the syntax of a unit test case and the meaning of the code elements of a method (e.g., method names, method arguments, variables, operators, and associated data types) from both the source code and natural language text.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a unit test case generation system that automatically generates a unit test case for a particular method (i.e., focal method). The unit test case generation system is based on a sequence-to-sequence neural transformer model with attention.

The unit test case generation system suggests to a software developer a unit test case given a focal method. A focal method is a method of a programming language. A unit test case is a set of executable programming statements that test the operation of the focal method. In one aspect, the unit test case generation system suggests a unit test case for methods of the Java programming language. In this aspect, the unit test case utilizes assertions to test the function or correct behavior of a method. An assertion is a statement recognized in the Java programming language that tests an assumption about the program. An assertion statement contains a Boolean expression that should be true when executed. If the assertion statement is false, an error is generated thereby identifying a possible defect in the program.

Figure 1:
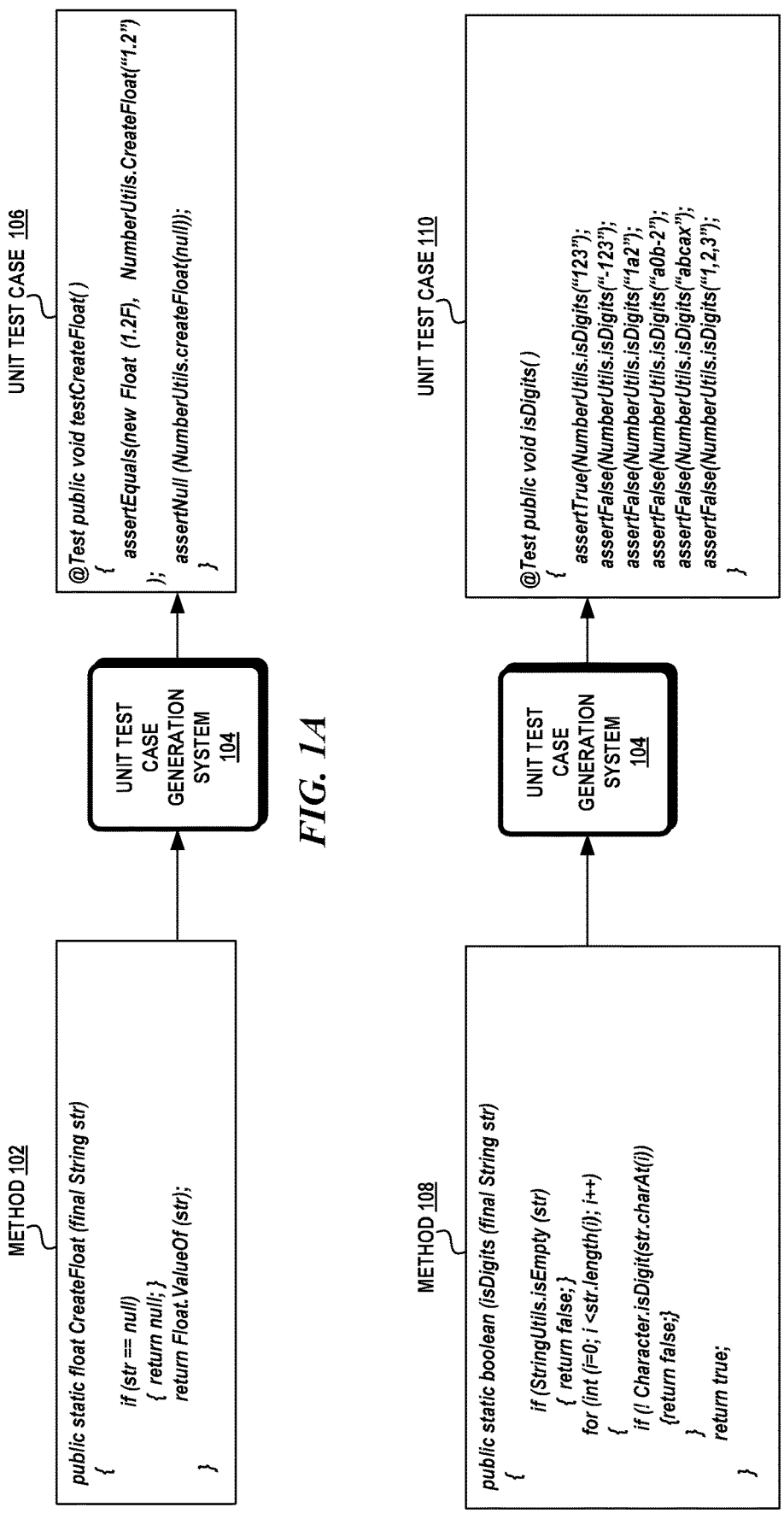
FIG. 1A illustrates an exemplary unit test case generated by a unit test case generation system for a first method and FIG. 1B illustrates another exemplary unit test case generated by the unit test case generation system for a second method.

For example, as shown in FIG. 1A, a developer may be writing a method, in the Java programming language, for the method CreateFloat 102. The method signature of the CreateFloat method, 102, includes a string parameter or argument, str. The method 102 returns a null value when the string argument, str, is null and returns a floating point value of the string argument when the string argument is not null.

In Java, a testing framework provides a set of assertion methods that are used in unit test cases. The assertEquals method checks if two objects are equal and if not, an AssertionError is raised. The assertNull method checks if an object is null and if not, an AssertionError is raised. A unit test case generation system 104 generates a unit test case 106 for method 102. The unit test case 106 checks if the method 102 correctly created a floating point number "1.2" by the assert statement, assertEquals(new Float (1.2 F), NumberUtils.CreateFloat("1.2")). The unit test case 106 also checks that the method returns a null string by the assert statement, assertNull (NumberUtils.createFloat(null)).

FIG. 1B illustrates an exemplary unit test case 110 that is generated for the isDigits method 108 by the unit test case generation system 104. The isDigits method 108 returns false if the string parameter, str, is empty or the string parameter contains any non-numerical characters and returns true otherwise. The unit test case 110 for this method uses assert statements that call the method with arguments that contain various combinations of numerical digits and characters. The unit test case 110 contains the statement, assertTrue(NumberUtils.isDigits("123"), which checks if a true value is returned when the method is called with the digits "123". The unit test case 110 contains assertFalse statements when the method is called with different strings which do not contain only digits, such as "−123", "1a2", "a0b-2", "abcax", and "1,2,3".

The unit test code generation system 104 is based on a neural transformer model with attention trained on an unsupervised dataset of source code and natural language text and a supervised dataset of mapped unit test case pairs. The neural transformer model with attention handles dependencies between its input and output with attention and without using recurrent neural networks (RNN) (e.g., long short-term memory (LSTM) network, Gated Recurrent Unit (GRU)), and convolutional neural networks (CNN). Attention is a mechanism that identifies which parts of an input sequence are relevant to each symbol in the output sequence and allows the neural transformer to access the entire input sequence all at once.

Attention now turns to a description of the architecture of the neural transformer model.

Transfer Learning

The neural transformer model with attention is trained through transfer learning. Transfer learning is a methodology of training models by pre-training the model using unsupervised learning on unlabeled data to learn generalized knowledge and then fine-tuning the model for sequence-to-sequence translation tasks via supervised learning on labeled data. The neural transformer model with attention is pre-trained on a large unsupervised training dataset of unlabeled English text and then on a large unsupervised training dataset of unlabeled source code. The neural transformer model with attention is then separately fine-tuned on mapped unit test case pairs.

Figure 2:
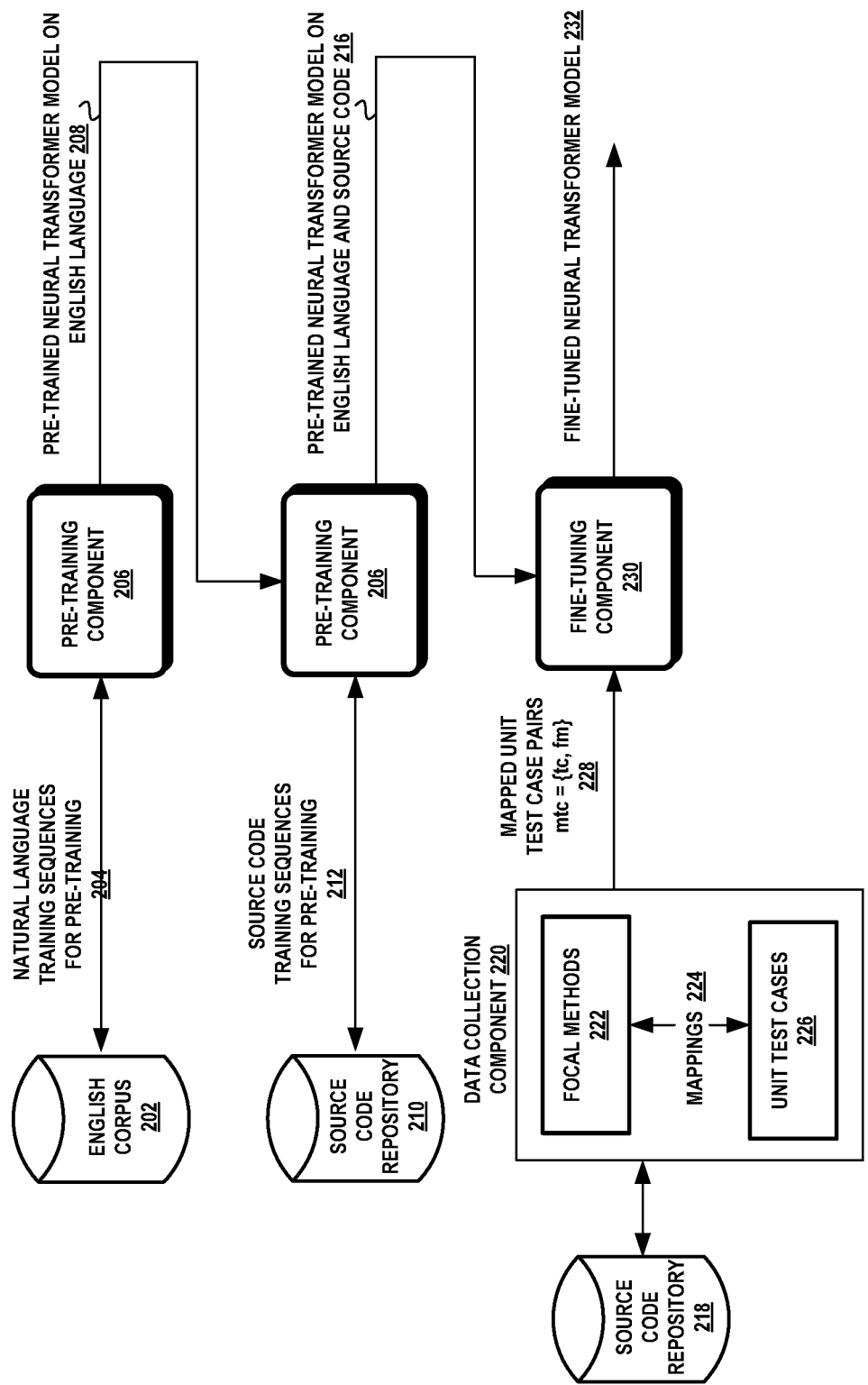
FIG. 2 is a schematic diagram illustrating the transfer learning process of the neural transformer model with attention.

FIG. 2 illustrates the various phases of training the neural transformer model with attention using transfer learning 200. Turning to FIG. 2, a pre-training component 206 generates an unsupervised training dataset 204 from a large corpus of English text 202. In one aspect, the English text may be obtained from any one or more of the following four corpora: (1) Books Corpus, and English Wikipedia corpus; (2) the English language portion of the CommonCrawl News ("CC-NEWS") dataset which contains 63 million English news articles crawled between September 2016 and February 2019; (3) the OPENWEBTEXT dataset; and (4) STORIES, a dataset containing a subset of the CommonCrawlNews data filtered to match the story-like style of Winograd schemas.

The pre-training component 206 also generates an unsupervised training dataset 212 from source code files from various source code repositories 210. A source code repository 210 may be a file archive and web hosting facility that stores large amounts of source code either privately or publicly. A source code repository 210 can be structured as a version control system, such as GIT, Mercurial, etc. The source code repository 210 may contain source code files from different domains, such as without limitation, scientific computing, web development, dataflow programming, machine learning, and the like.

The pre-training component 206 trains a neural transformer model with attention on both the English language text and the source code independently. As shown in FIG. 2, the pre-training component 206 trains a neural transformer model with attention 208, 216 on the English text sequences 204 and then the source code sequences 212. In one aspect, the order in which the pre-training component 206 trains the neural transformer model is performed by first training on the English corpus and then subsequently pre-training on source code. The pre-training on the English corpus first allows the model to learn semantic relationships between words. The subsequent pre-training on source code is intended to specialize the model on source code, aiming at learning syntactical properties of the programming language, while retaining semantic knowledge.

A data collection component 220 mines a source code repository 218 to obtain mappings 224 of unit test cases 226 to focal methods 222. A mapped unit test case 228 is formatted as a pair, $mtc_i = \{tc_i, fm_i\}$, where $mtc_i$ represents a mapping of a unit test case, $tc_i$, to a focal method, $fm_i$. The mapped unit test cases 228 are used to train the neural transformer model with attention to learn to translate an input sequence to an output sequence. The output of the transfer learning system is a trained neural transformer model with attention 232 that can translate a focal method into unit test case for the focal method.

Attention now turns to a description of a neural transformer model with attention.

Neural Transformer Model Architecture

Figure 3:
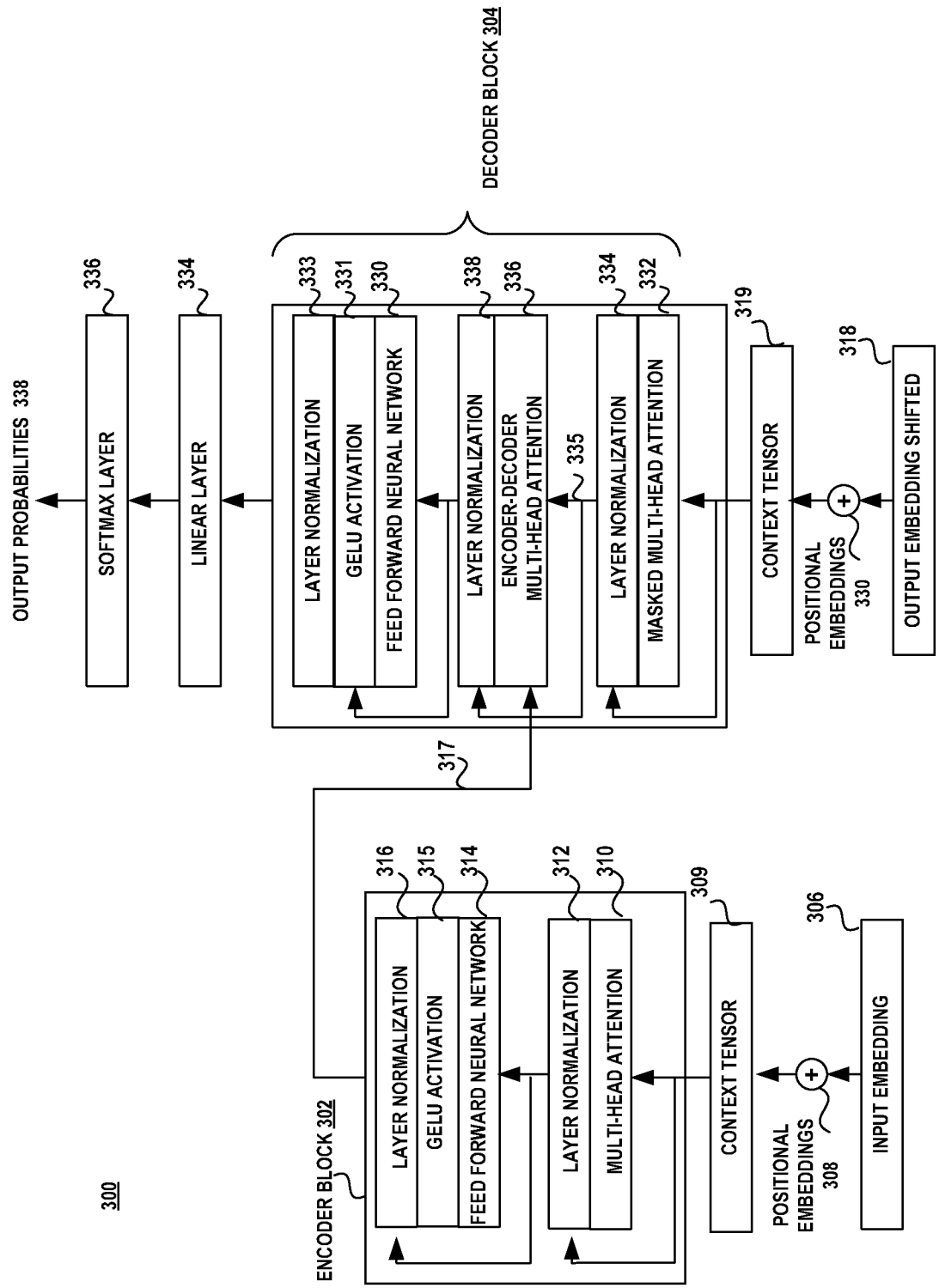
FIG. 3 is a schematic diagram illustrating an exemplary architecture of a neural transformer model based on encoder and decoder blocks with attention having Gaussian Error Linear Activation Units.

FIG. 3 shows an exemplary structure of the neural transformer model with attention in an encoder-decoder configuration. The neural transformer model with attention 300 contains one or more encoder blocks 302 and one or more decoder blocks 304. The initial inputs to an encoder block 302 are the input embeddings 306 of an input sequence of a training dataset. In order to retain the order of the tokens in the input sequence, positional embeddings 308 are added to the input embedding 306 forming a context tensor 309. The initial inputs to the decoder block 304 are a shifted sequence of the output embeddings 318 to which the positional embeddings 320 are added forming context tensor 319.

An encoder block 302 consists of two layers. The first layer includes a multi-head attention component 310 followed by layer normalization component 312. The second layer includes a feed-forward neural network 314 followed by a Gaussian Error Linear Unit (GELU) activation layer 315 and then a layer normalization component 316. The context tensor 309 is input into the multi-head attention layer 310 of the encoder block 302 with a residual connection to layer normalization 312. The output of the layer normalization 312 is input to the feed forward neural network 314 with another residual connection to layer normalization 316. The output of the encoder block 302 is a set of hidden representations 317. The set of hidden representations 317 is then sent through additional encoder blocks, if multiple encoder blocks exist, or to the decoder 304.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 310 takes a context tensor 309 and weighs the relevance of each subtoken represented in the context tensor to each other by generating attention weights for each subtoken in the input embedding 306. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots, \text{head}_h)W^O,$$

where $\text{head}_i = \text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 312 that precedes the feed forward neural network 314 and a second layer normalization 316 that follows the feed forward neural network 314.

The feed-forward neural network 314 processes each output encoding separately 313. The output of the top encoder block is a set of attention vectors K and V 317 which is used by the encoder-decoder multi-head attention layer 326 of the decoder block 304.

The GELU is an activation function that scales the output of the feed-forward neural networks for the layer normalization layer. The GELU is defined as follows:

$\text{GELU}(x)=0.5 \times (1+\tan\ h\ (\sqrt{2}/\pi\ (x+0.044715x^3)))$. The GELU activation function is used to achieve faster and better convergence that a sigmoid function and to avoid the vanishing gradient problem.

The decoder block 304 predicts each subtoken $t_i$ in the target language one-by-one at each time step conditioned on all previously-generated target subtokens $t_1, \ldots t_{i-1}$. The decoder block 304 consists of three layers. The first layer includes a masked multi-head attention component 322 followed by a layer normalization component 324. The output of the layer normalization component 324 is input into the encoder-decoder multi-head attention component 326 with a residual connection to layer normalization component 328. The second layer includes an encoder-decoder multi-head attention component 326 followed by a layer normalization component 328. The output of layer normalization component 328 is input into the feed forward neural network 330 with a residual connection to layer normalization component 332. The third layer includes a feed forward neural network 330 followed by GELU activation 331 and then a layer normalization component 332.

The masked multi-head attention component 322 receives the output embeddings of the previous timestep. The masked multi-head attention component 322 masks the output embeddings from future time steps. The encoder-decoder multi-head attention layer 326 receives queries from the previous decoder layer 325 and the memory keys and values 317 from the output of the encoder block 302. In this manner, the decoder block 304 can attend to every position of the input sequence. The feed-forward neural network 330 processes each output encoding separately. A layer normalization component 324, 328, 332 is used between the layers in order to normalizes the inputs across the features.

The linear layer 334 projects the vector produced by the stack of decoders into a log its vector. The softmax layer 336 then turns the scores of the log its vector into probabilities for each subtoken in the vocabulary which are positive and normalized.

In one aspect, the neural transformer model contains a stack of twelve encoder blocks and a stack of twelve decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Methods

Attention now turns to a description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
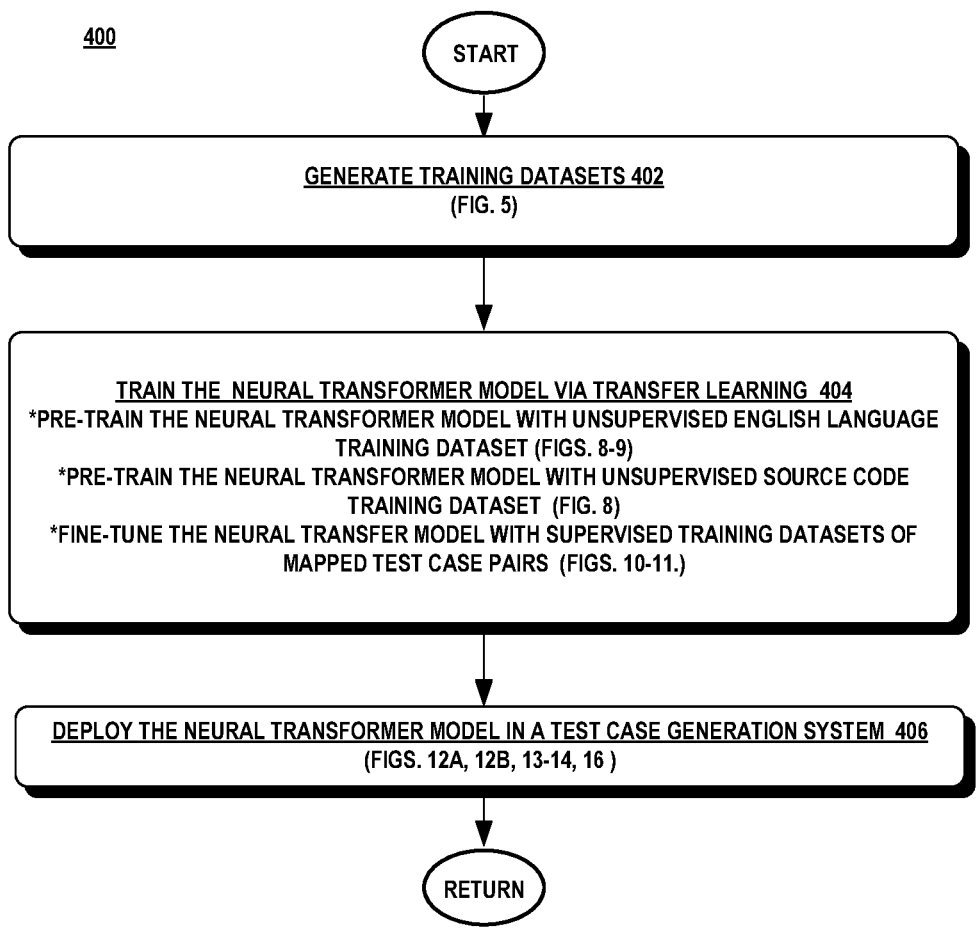
FIG. 4 is a flow diagram illustrating an exemplary method for training the neural transformer model with attention and deploying the neural transformer model with attention in a unit test case generation system.

FIG. 4 is a flow diagram illustrating an exemplary process for training a neural transformer model with attention for unit test case generation and deploying the neural transformer model with attention in a unit test case generation system 400. Initially, the training datasets are generated (block 402). The training datasets include sequences of English text, sequences of source code and mapped unit test case pairs (block 402). The neural transformer model with attention is then trained through a transfer learning process that includes pre-training the neural transformer model with an unsupervised training dataset of English text and source code (block 404) and fine-tuning the neural transformer model with a supervised training dataset of mapped unit test case pairs (block 404). When the model has been trained and verified successfully, the neural transformer model with attention is deployed into a unit test case generation system (block 406).

Generating Training Datasets

Figure 5:
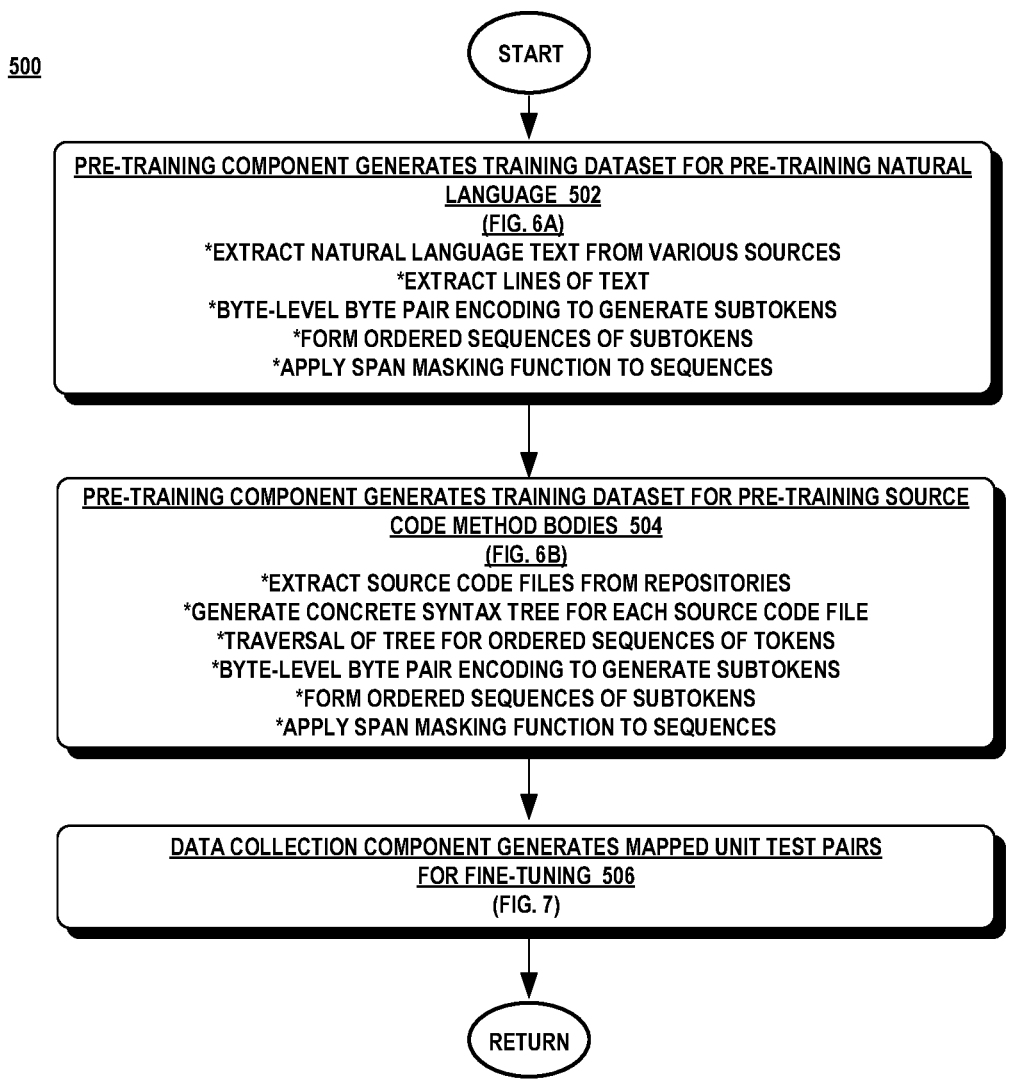
FIG. 5 is flow diagram illustrating an exemplary method for training the neural transformer model with attention.
Figure 6A:
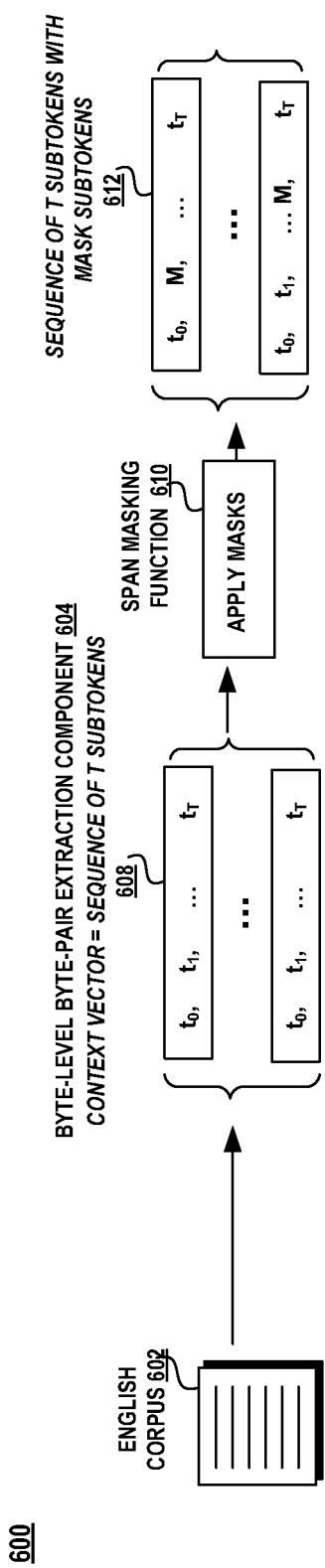
FIGS. 6A and 6B are schematic diagrams illustrating an exemplary process for generating masked sequences of the pre-training datasets.
Figure 6B:
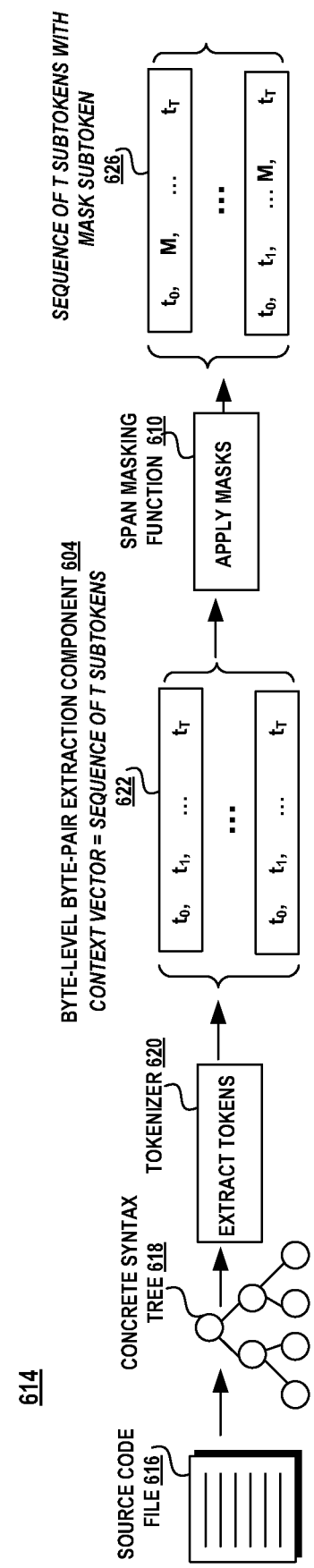

FIGS. 5, 6A and 6B illustrates an exemplary method 500 for generating the unsupervised training datasets. Turning to FIGS. 5 and 6A, the pre-training training component 206 generates an unsupervised training dataset to pre-train the neural transformer model with attention on a natural language (block 502). In one aspect, the natural language is English language text. A diverse corpus of unlabeled English text, derived from the sources noted above 602, is used to obtain sequences of English-language text. A byte-level byte-pair extraction component 604 is used to generate T-ordered sequences of subtokens 608 from each line of English text, where T is the maximum context length. Byte-level byte-pair encoding (BBPE) is used to generate the vocabulary used by the neural transformer model with attention. A text string of natural language text is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 502).

The byte-level subwords are generated using the Byte Pair Encoding (BPE) component 604, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a natural language text segment. The T-ordered sequence of subtokens are represented into a context vector 608. (Collectively, block 502).

A denoising function, such as a span masking function 610, is then applied to each sequence that randomly masks out a subset of subtokens and the masked span of subtokens is replaced with a mask subtoken, M. The model is trained with the masked sequences 612 to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 502).

Turning to FIGS. 5 and 6B, the pre-training component 206 generates a pre-training dataset from a corpus of unlabeled source code programs or files 602 in the same programming language. This is referred to as unsupervised learning since the model draws inferences from the input data without labeled responses. The pre-training component 206 extracts selected source code files 602 from various source code repositories where the source code is written in a same programming language. In one aspect, the pre-training component 206 extracts source code files 602 written in the Java programming language. (Collectively, block 504).

The pre-training component 206 transforms each of the selected source code files 616 into a concrete syntax tree 618. The concrete syntax tree 618 represents the source code text in a parsed form. The concrete syntax tree 618 may also be a parse tree. A concrete syntax tree 618 represents the syntactic structure of a program in a hierarchical or tree structure. The concrete syntax tree 618 is an n-ary tree data structure that includes nodes that represent a construct in the grammar of the programming language of a program. The concrete syntax tree 618 includes one root node, multiple internal nodes, and multiple terminal nodes. The terminal nodes represent the tokens. A token is a symbol that represents an operand or an operator. The concrete syntax tree 618 differs from an abstract syntax tree where the terminal nodes represent operands. (Collectively, block 504).

The pre-training component 206 uses a tokenizer 620 to extract tokens from the concrete syntax tree 618. The frequently-used elements in a programming language are encoded into tokens and the less frequently-occurring elements are encoded into combinations of characters referred to as subtokens. For simplicity, the term subtoken shall include tokens and subtokens. (Collectively, block 504).

The pre-training component 206 uses a byte-level byte-pair extraction component 604 to generate T-ordered sequences of subtokens 622 as noted above. A denoising function, such as a span masking function 610, is then applied to each sequence 612 that randomly masks out a subset of subtokens and the masked span of subtokens is replaced with a mask subtoken, M, as noted above. (Collectively, block 504).

Figure 7:
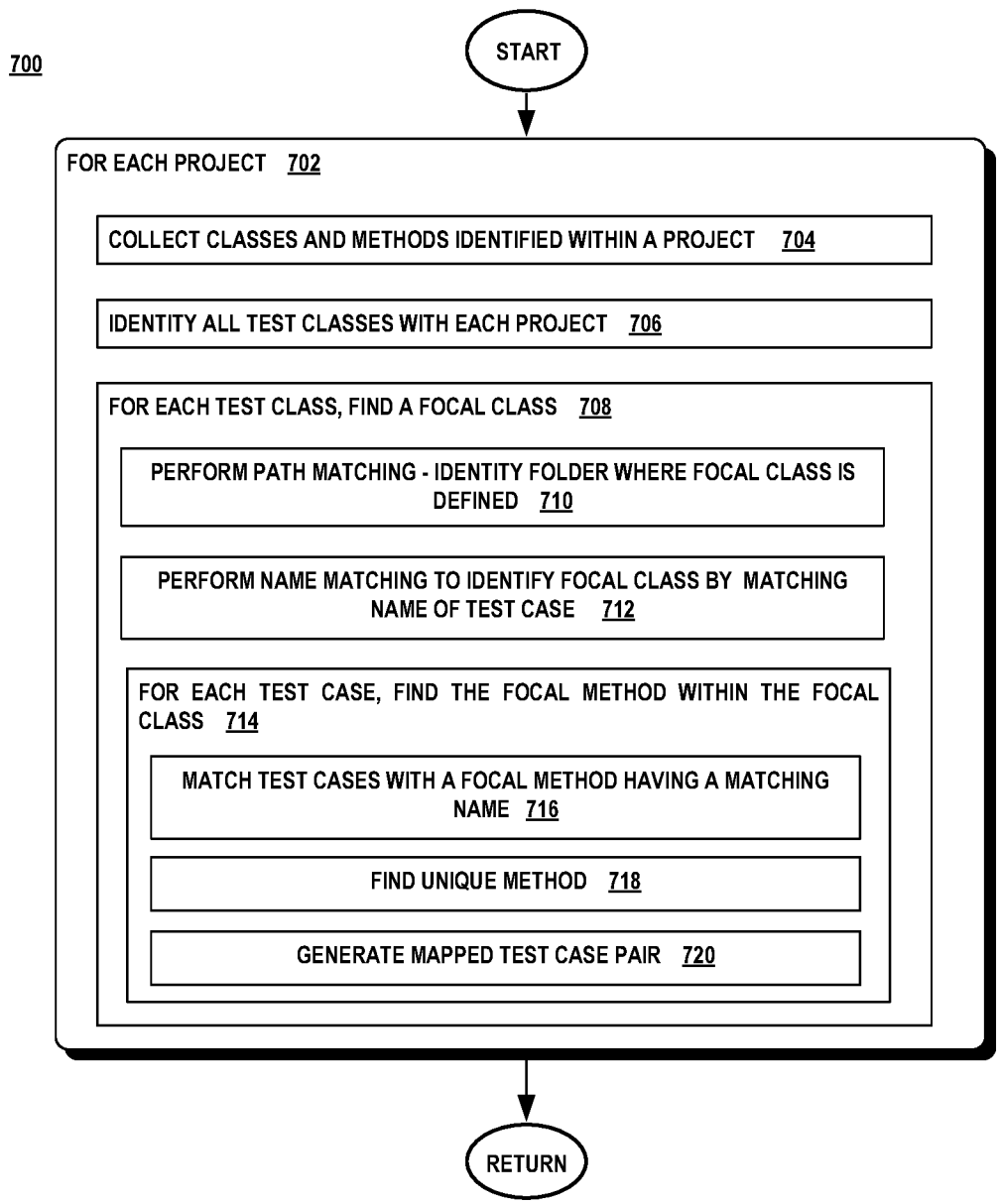
FIG. 7 is a flow diagram illustrating an exemplary method for generating the mapped unit test case pairs.

Turning back to FIG. 5, the data collection component 220 generates mapped unit test case pairs by mining source code repositories to find unit test cases and their corresponding focal methods (block 506). FIG. 7 illustrates an exemplary method for generating the mapped unit test case pairs. Projects from a source code repository are mined for unit test cases and their corresponding focal method. For each project (block 702), the project is parsed to obtain classes, methods from the source code files in a project and their associated metadata (e.g., method names, class names, method signatures, method bodies, annotations, and variables) (block 704).

Next, the test classes which are the classes that contain a unit test case are identified (block 706). For some programming languages, there is an associated test framework which includes support for testing. JUnit is one such testing framework for the Java programming language. JUnit uses annotations to identify methods that specify a unit test, such as the @ Test annotation. In this step, the data collection component finds a unit test class if it contains at least one method with the @Test annotation.

For each unit test class, a corresponding focal class is found (block 708). The focal class represents the class under test. First, a path matching heuristic is performed to identify the folder where the focal class is defined by following the path of the unit test class starting with the src/main folder (block 710). Next, name matching is performed to identify the focal class by matching the name of the unit test case without the "Test" prefix/suffix (block 712).

For each unit test case, the corresponding focal method within the focal class is identified (block 714). A unit test case is the method within a unit test class with the @Test annotation. First, the data collection component attempts to match the unit test cases with a focal method having a matching name after removing the @Test prefix/suffix (block 716). If a match exists, then the unit test case and the focal method are generated as a mapped unit test pair (block 720).

If this attempt does not identify a focal method then the intersection between the list of method invocations within the unit test case and the list of methods defined within the focal class is computed (block 718). If the intersection yields a unique method, then the unique method is selected as the focal method (block 720). Since the unit test class is matched with the focal class and the unit test case invokes a single method within that focal class, it is likely that the unit test case is testing the single method (block 720). A mapped unit test pair is then generated from the unit test case and the single method (block 720).

Attention now turns to a discussion of the training of the neural transformer model with attention with the training datasets.

Training the Neural Transformer Model

Figure 8:
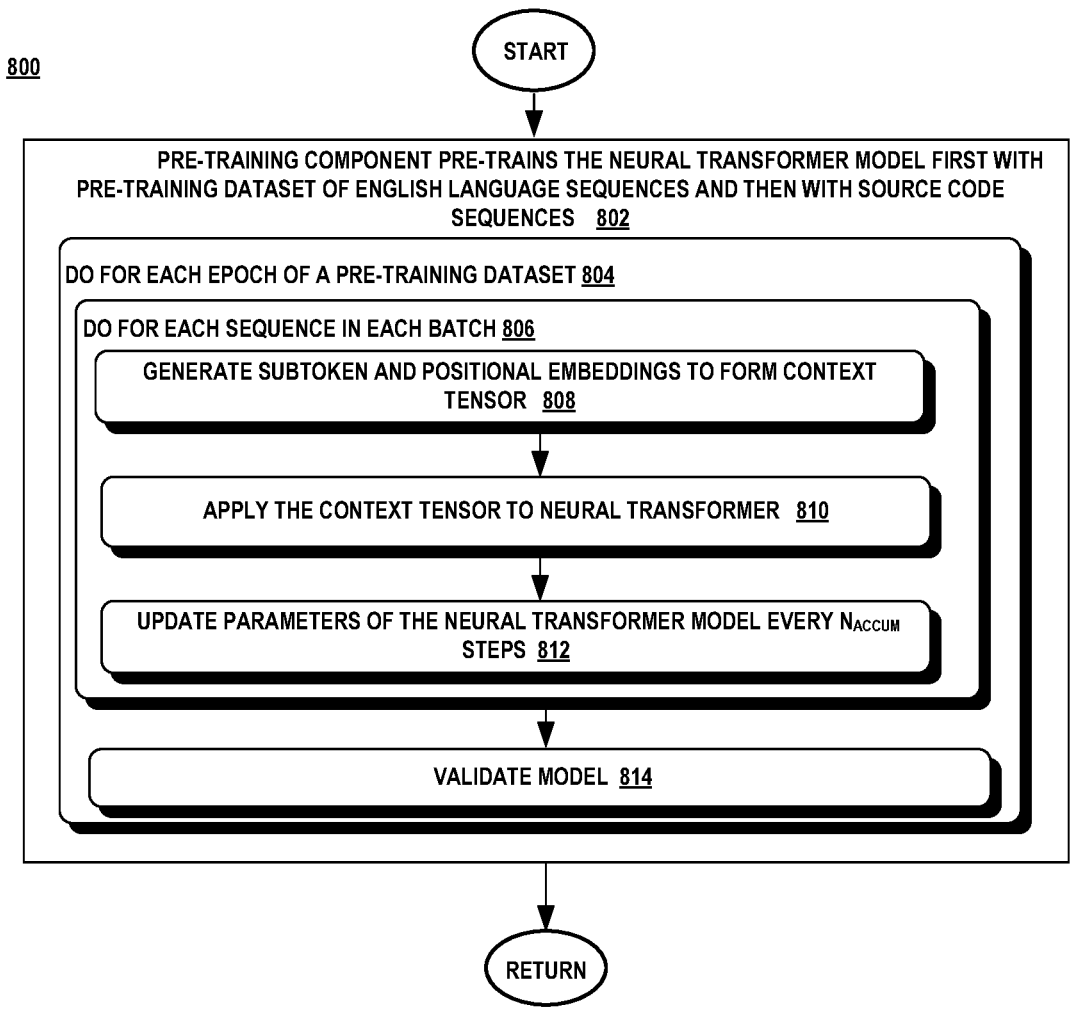
FIG. 8 is a flow diagram illustrating an exemplary method for pre-training the neural transformer model with attention with source code and natural language text.
Figure 9:
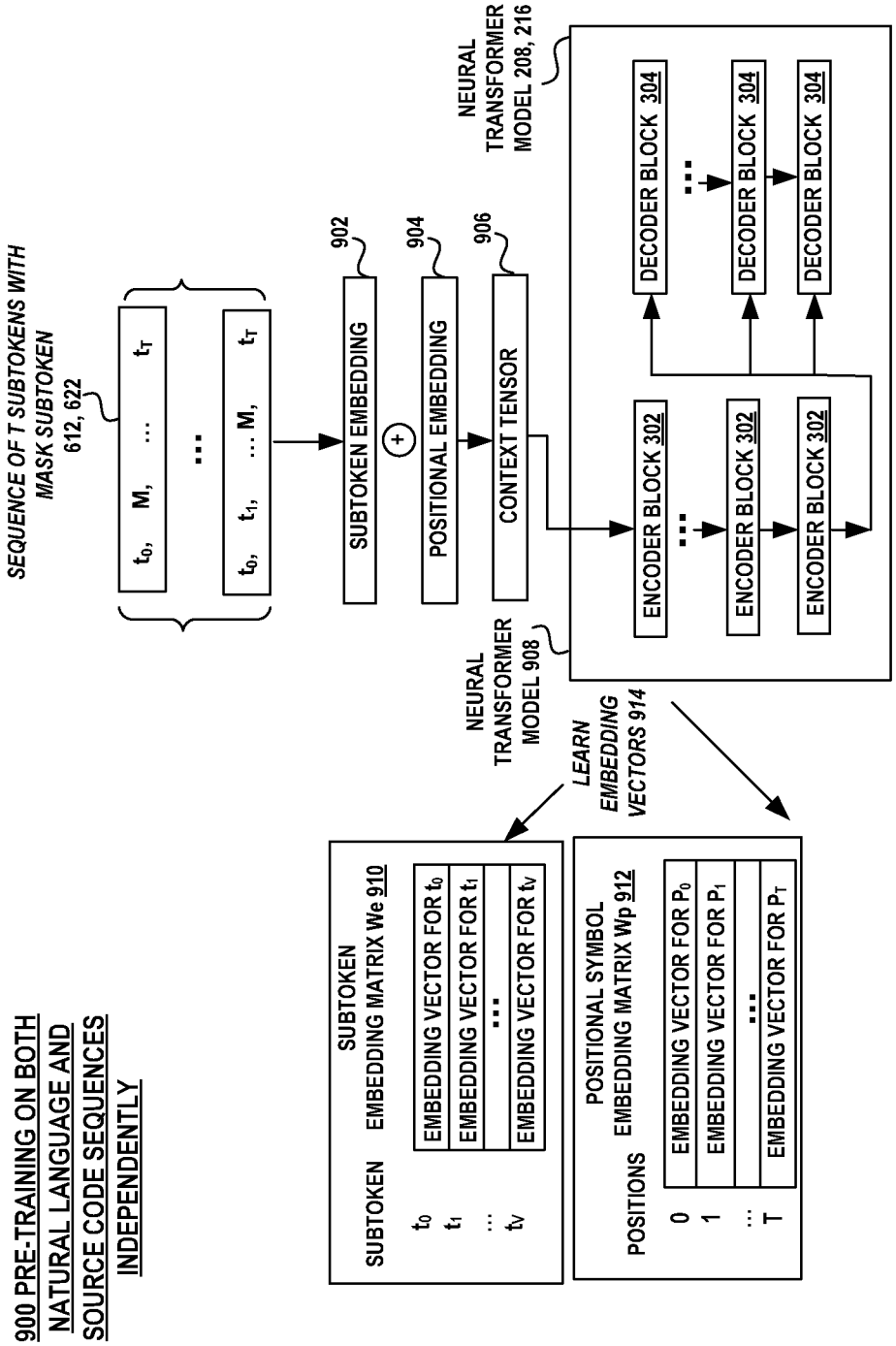
FIG. 9 is a schematic diagram illustrating an exemplary process of pre-training the neural transformer model with attention and the components used therein on a natural language and source code.

Turning to FIGS. 8 and 9, the pre-training component 206 pre-trains the neural transformer model with attention with the pre-training datasets (e.g., English text and source code) (block 802). Each pre-training dataset is used to train the neural transformer model independently 900. For example, masked sequences of English text are feed through the pre-training pipeline first (blocks 802-818) and when that phase of the training is completed, the process repeats with the masked sequences of source code (blocks 802-818).

Neural transformer models are trained iteratively, making multiple passes over the pre-training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 802).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 802).

In one aspect, the hyperparameters may include the following: (1) subtoken and position embedding layers of dimensions: 30000×768, and 1024×768 respectively; (2) the configuration of the neural transformer model with twelve encoder blocks and twelve decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and an inverse square root learning rate schedule with the base learning rate of 0.0001; a warmup period of 5000 update steps; local gradient accumulation with a frequency of four update steps; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 802).

For each sequence of each batch in each epoch (blocks 804, 806), the T-ordered sequences of subtokens are then mapped into numeric vectors and then into respective subtoken embeddings 902 and positional embeddings 904 (block 808). An embedding is a learned representation for the text-based subtokens where subtokens that have a common meaning have a common representation. An embedding is a mapping of discrete categorical variables to a vector of continuous numbers. There is an embedding for each subtoken in the vocabulary 910 and a corresponding positional embedding 912. The subtoken embedding matrix 910 represents the learned representation for the subtokens of the vocabulary. The neural transformer model 208, 216 does not read each subtoken sequentially and as such, has no knowledge of the subtoken's position in a sequence without additional position information. The positional embedding matrix 912 is used to embed position information about a subtoken's position in a sequence into the neural transformer model 208, 216.

Initial values are generated for the subtoken embedding 902 and positional embeddings 904 of each sequence which are then used to form a context tensor 906. Thereafter, the neural transformer model 208, 216 learns the values for each embedding 914. Upon the completion of the pre-training phase, the embeddings for each subtoken and the positional embeddings are saved into respective matrices 910, 912 for later use. There is a subtoken embedding matrix, We, 910 that contains an embedding vector for each subtoken $t_i$, i=0 . . . V, and a positional embedding matrix, Wp, 912 that contains an embedding vector $P_j$, j=0 . . . T, for each position, where V is the size of the vocabulary and T is the length of the subtoken sequence. (Collectively, block 810).

The first encoder block 302 of the neural transformer model 612, 622 takes the context tensor 906 as input and passes it through the multiple layers of multi-head attention, layer normalization, feed-forward neural network, GELU activation, and layer normalization to finally produce a set of hidden representations. If there are additional encoder blocks, the output of each encoder block is passed onto the next encoder block with the output of the last encoder block producing the set of hidden representations. The set of hidden representations is passed onto each decoder block. (Collectively, block 810).

The decoder blocks 304 of the neural transformer models 208, 216 takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 810).

The feed forward neural networks in the encoder blocks 302 and the decoder blocks 304 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 810).

At the completion of each batch, the parameters of the neural transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 812).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 814).

Fine-Tuning

After the pre-training is performed, the neural transformer model with attention is fine-tuned on the mapped unit test case pairs. The fine-tuning ensures that the neural transformer model with attention understands the relationship between a focal method and a unit test case by training the model with these pairs. Specifically, the optimization objective during fine tuning includes unit test case prediction given the focal method as an input. The weights of the pre-trained model are transferred and joined to optimize all of the trainable parameters including both the transformer layers and the task-specific head of the model.

Figure 10:
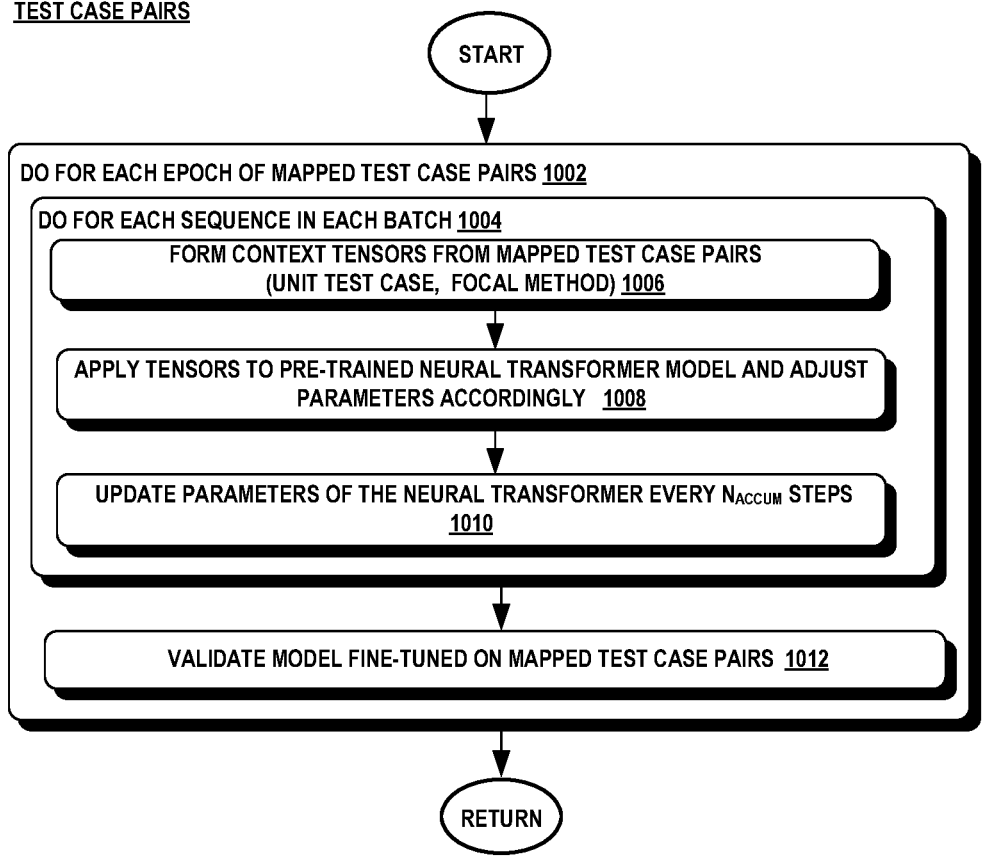
FIG. 10 is a flow diagram illustrating an exemplary method for fine-tuning the neural transformer model with attention.
Figure 11:
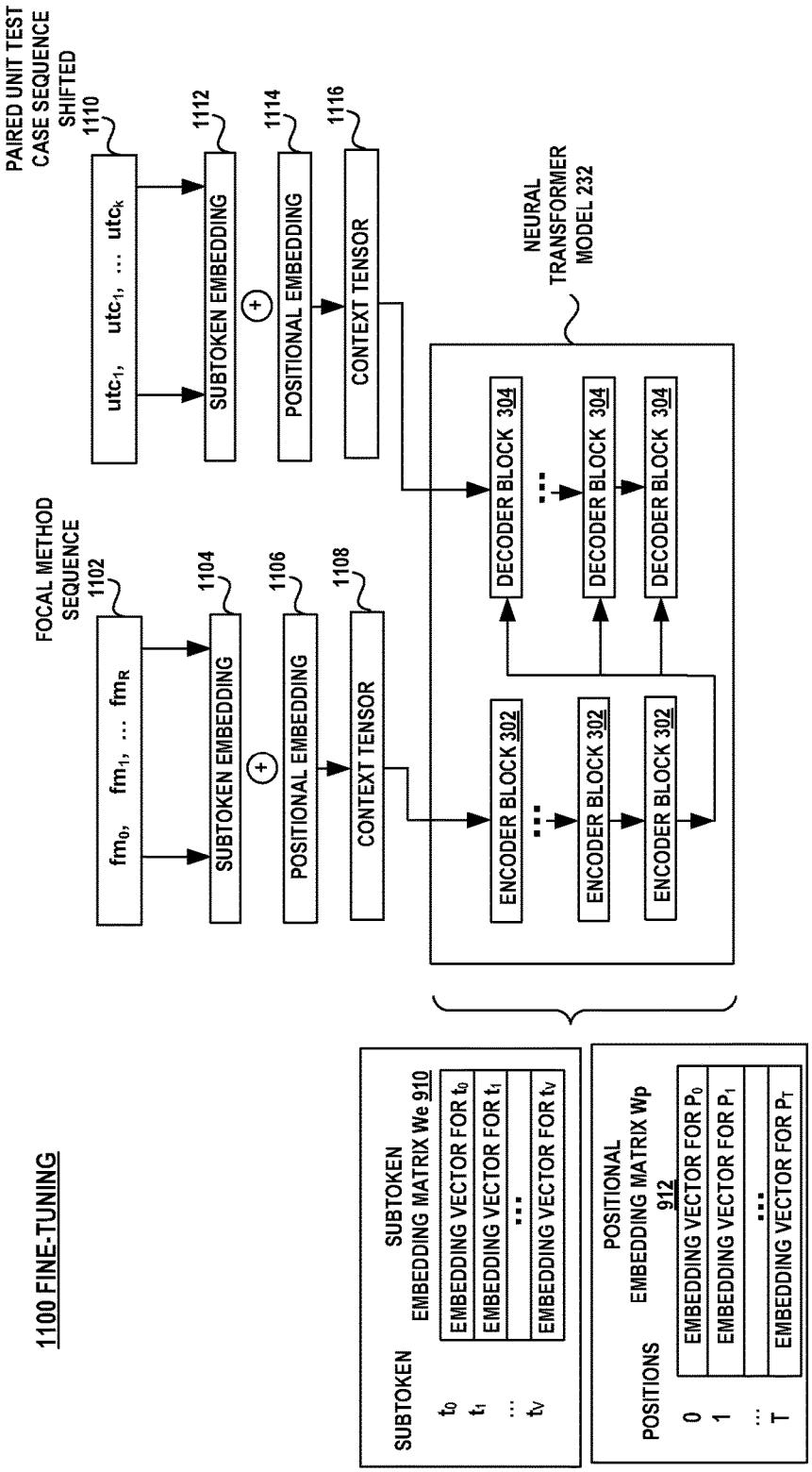
FIG. 11 is a schematic diagram illustrating an exemplary process of fine-tuning the neural transformer model with attention with mapped unit test case pairs.

Turning to FIGS. 10 and 11, the fine-tuning component 230 follows a similar method 1000 noted above with respect to the pre-training. Initially, the fine-tuning component 230 obtains the ordered sequence of subtokens 1102 representing a focal method 1102 and the corresponding paired unit test case sequence of subtokens 1110. The paired unit test case sequence of subtokens 1110 is shifted at teach timestep. The size of each sequence 1102, 1110 is based on the variable number of subtokens in a sequence. For each paired sequence of each batch in each epoch (blocks 1002, 1004), the ordered sequences of subtokens are then mapped into numeric vectors and then into respective subtoken embeddings 1104, 1112 and positional embeddings 1106, 1114 (block 1006). The respective subtoken embedding 1104, 1112 and its paired positional embedding 1106, 1114 are combined into a context tensor 1108, 1116 (block 1006).

The context tensor 1108 is applied to the encoder blocks 302 and the context tensor 1116 is applied to the decoder blocks 304. The parameters of the model are adjusted accordingly along with the subtoken and positional embedding matrices 910, 912 (blocks 1008). The parameters are updated for every Nachum steps (block 1010). The neural transformer model with attention is then validated (block 1012) before deployed into a unit test case generation system.

Attention now turns to discussion of the use of the neural transformer model in an inference system.

Inference Phase

The inference phase of the unit test case generation system relies on a beam search to generate the unit test case for a focal method. The decoder's computation at training time can be parallelized using masked self-attention but during inference, the subtokens are generated one token at a time. The neural transformer model factorizes the probability of the target subtokens in an input sequence into a product of conditional probabilities for each subtoken using the formula:

$$p(t_1, \ldots t_m | s) = \prod_{i=1}^{m} p(t_i | t_1, \ldots, t_{i-1}, s).$$

During inference, the calculation of $\arg\max_t p(t|s)$ is complex and extremely time consuming making the model useless for real-time applications. Beam search is an approximation algorithm that performs faster.

The beam search uses the probability distribution generated by the neural transformer model to identify the top k subtokens likely to be the next subtoken in a candidate unit test case sequence. The beam search expands the search by instantiating new partial sequences using each of the selected subtokens identified by the neural transformer model's probability distribution. The search continues generating new partial sequences from the top k subtokens identified by the output distributions from the neural transformer model until the search ends. The search may end when the end-of-method subtoken appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end of a method token is predicted as being the next likely subtoken candidate.

Figure 12A:
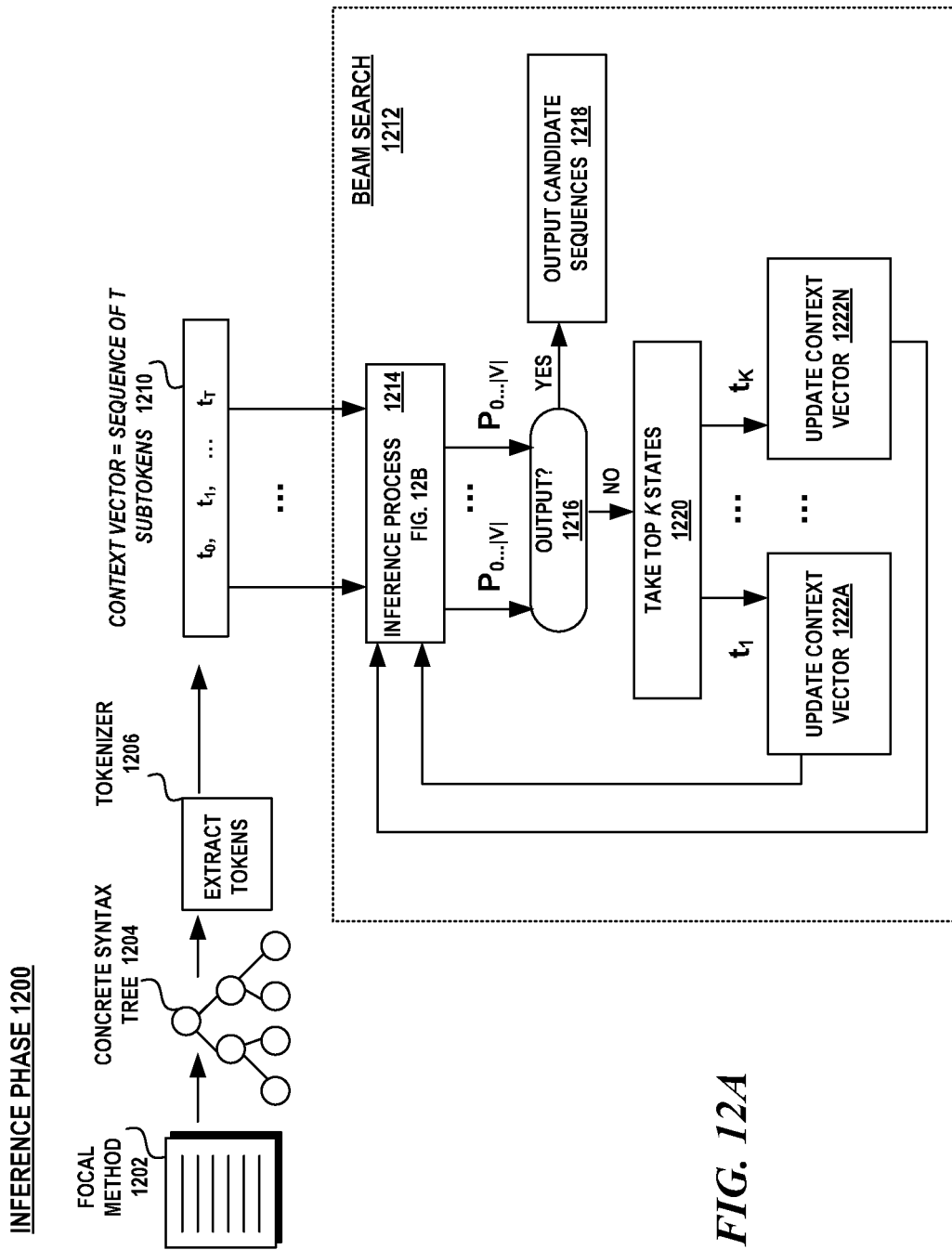
FIGS. 12A-12B are schematic diagrams illustrating the interference process that uses the neural transformer model.

Turning to FIG. 12A, there is shown components of the inference phase 1200. The unit test case generation system receives a focal method 1202 for which it will generate a unit test case. The focal method is transformed into a corresponding concrete syntax tree 1204. The concrete syntax tree 1204 is traversed, by a tokenizer 1206, to extract tokens and/or subtokens in an ordered sequence. The ordered sequence of T subtokens is then vectorized into a context vector 1210.

The beam search 1212 uses the context vector 1210 to initiate an inference process 1214 using the probability distribution generated from the neural transformer model, $P_0 \ldots P_{|V|}$ (block 1214). If the probability distribution indicates that an end-of-method token is the most likely subtoken to follow in a partial unit test case candidate sequence (block 1216—yes), then the top k unit test case candidates are output (block 1218). Otherwise, the beam search 1212 takes the top k states or subtokens identified from the probability distribution generated by the neural transformer model in the inference process (block 1220). A new context vector is generated for each of the k states, $c_1, \ldots c_k$, using the new subtoken in the context vector (blocks 1222A, 1222N). The new context vectors are then input into the inference process (blocks 1222A, 1222N, 1214). The beam search 1212 ends when the end-of-method token is selected as the most likely candidate to complete a candidate unit test case.

Figure 12B:
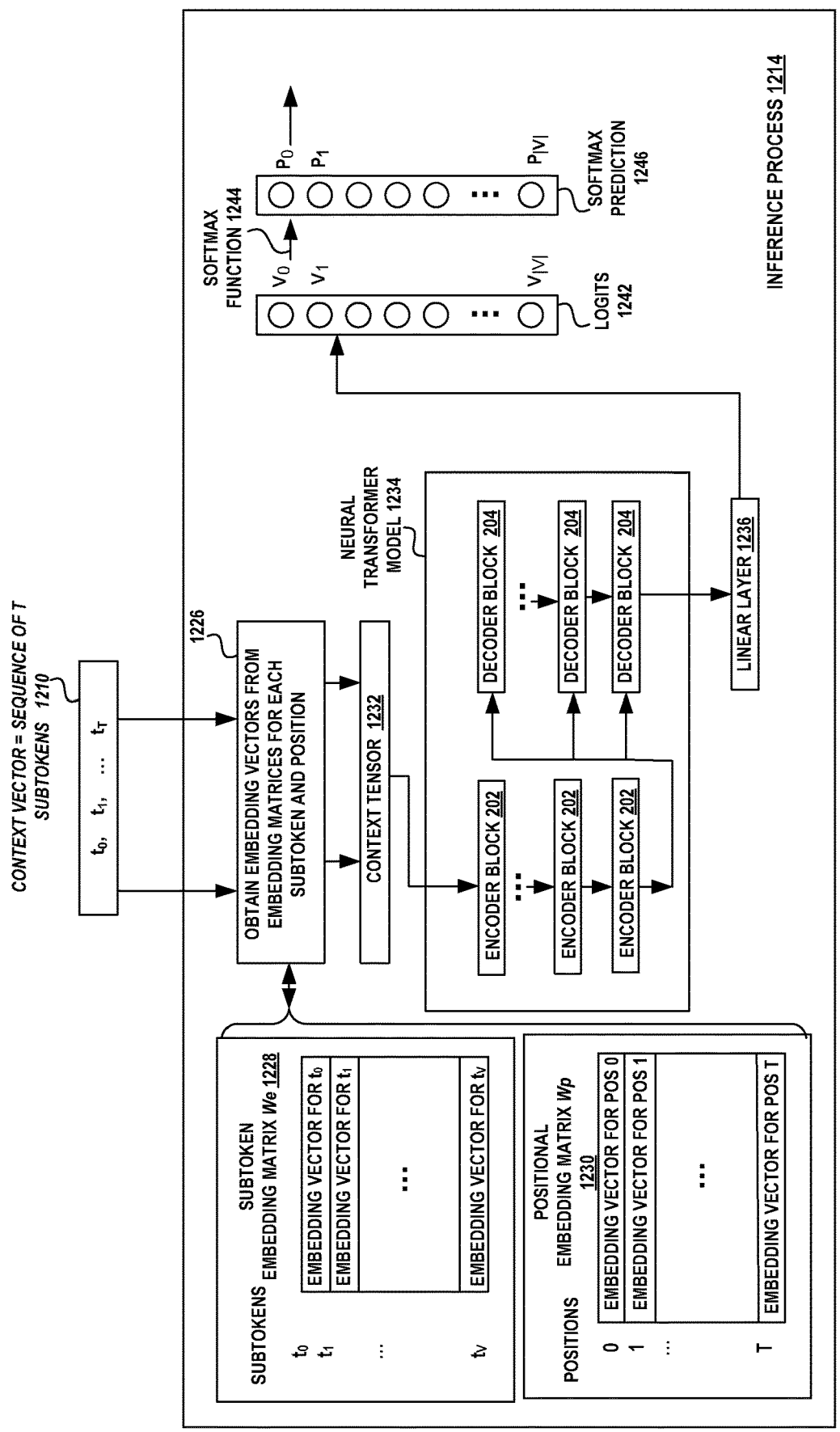

FIG. 12B illustrates an exemplary inference process 1214. An embedding vector for each subtoken in a sequence 1210 is obtained from the subtoken embedding matrix 1228 and its corresponding positional vector from the positional embedding matrix 1230 (block 1226). The obtained subtoken embedding vector and its corresponding positional embedding vector are combined to form a context tensor 1232 which is input into the neural transformer model 1234. The context tensor 1232 is applied to the encoder blocks 202 and decoder blocks 204 of the neural transformer model 1234.

The last decoder block outputs a vector of floating point numbers that is projected by the linear layer 1236 into unnormalized predictions or log its $V_0 \ldots V_{|V|}$ 1242. The log its 1242 are normalized using the softmax function 1244 to generate the softmax prediction 1246 $P_0 \ldots P_{|V|}$.

Unit Test Generation

In one aspect, the neural transformer model is used in a unit test generation system. The unit test generation system may be embodied as a feature that can be an add-on, plug-in, extension and/or component of a source code editor, browser, application, integrated development environment ("IDE"), and/or code management system.

Figure 13:
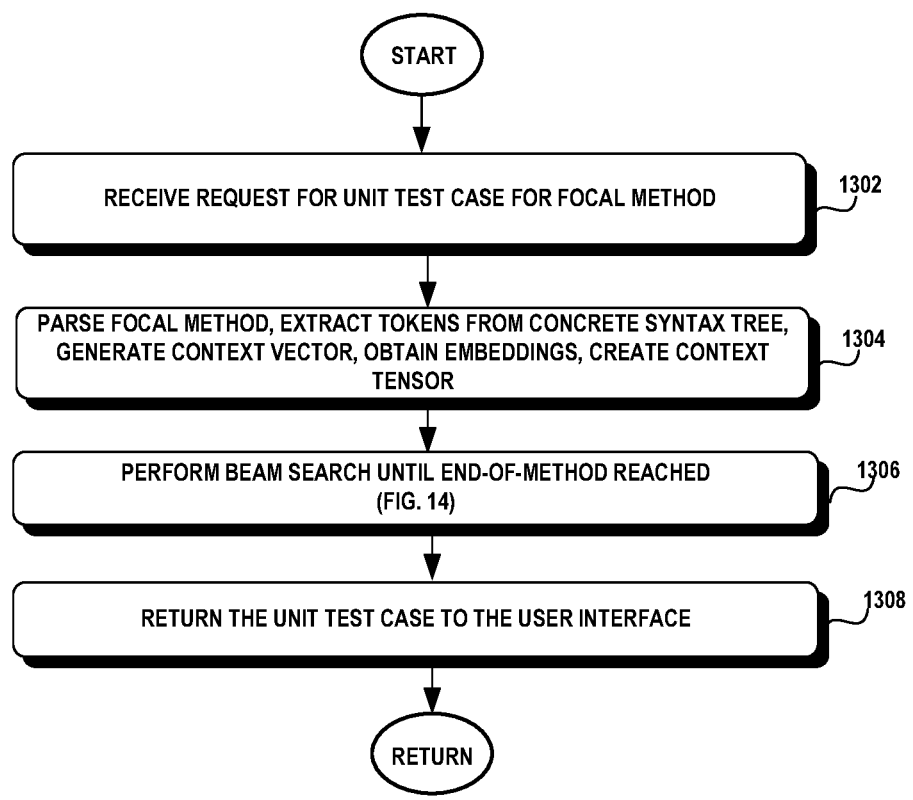
FIG. 13 is a flow diagram illustrating an exemplary method of generating a unit test case.

Turning to FIG. 13, there is shown an exemplary method 1300 of a unit test case generation system. The unit test generation case system 104 receives a request for the generation of a unit test case for a particular focal method (block 1302). The focal method is parsed into a concrete syntax tree from which a tokenizer extracts tokens, generates a context vector representing a sequence of subtokens, obtains embeddings for the subtokens and creates a context tensor as noted above (block 1304). The unit test case generation system performs a beam search until an end-of-method subtoken is reached (block 1306). The top k unit test case candidates are returned (block 1308).

Figure 14:
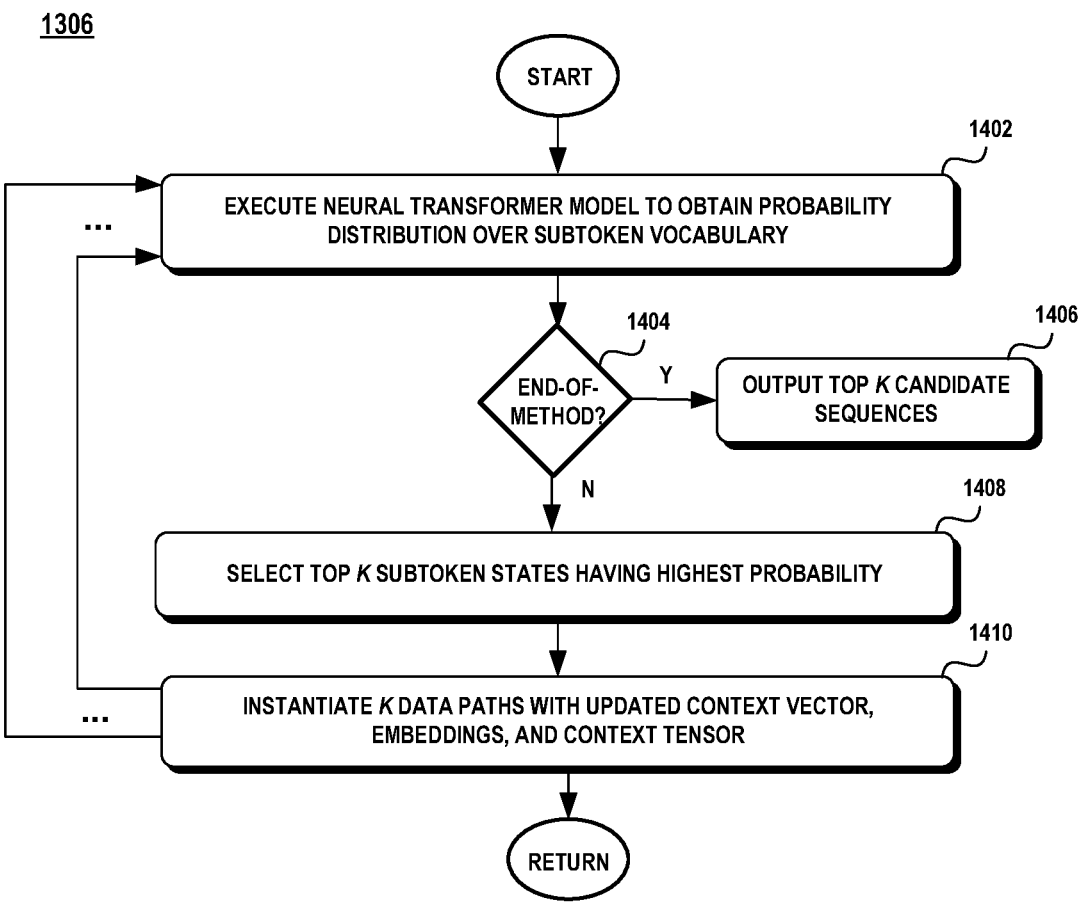
FIG. 14 is a flow diagram illustrating an exemplary method of the beam search used to generate a unit test case candidate.

Turning to FIG. 14, the beam search 1306 uses the neural transformer model with attention with the context tensor to generate a probability distribution for the subtoken vocabulary (block 1402). If the probability distribution indicates that the next likely token is the end-of-method token, then the beam search is finished (block 1404—yes) and the top k unit test case candidates are returned (block 1406). Otherwise (block 1404—no), the top k subtokens to complete a partial sequence are selected (block 1408).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of tk, $t_0, t_1, \ldots, t_{T-1}$. (Collectively, block 1410).

Figure 16:
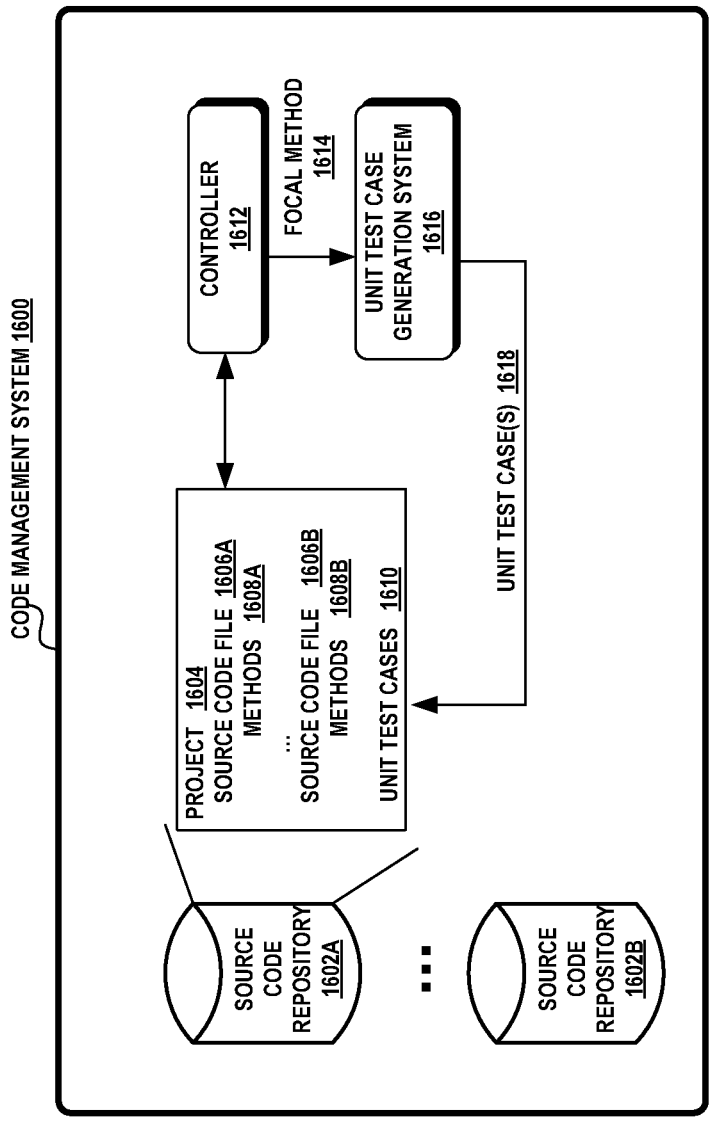
FIG. 16 is a schematic diagram illustrating an exemplary code management system utilizing the unit test case generation system.

FIG. 16 illustrates an exemplary implementation of the unit test case generation system. In this example, the unit test case generation system is part of a code management system 1600 which hosts and manages source code repositories 1602A-1602B (e.g., GitHub) through a controller 1612. In one aspect, a source code repository 1602A-1602B contains one or more projects 1604 having source code files 1606A, 1606B with methods 1608A, 1608B. A project 1604 may include unit test cases 1610 for the methods 1608A, 1608B of the source code files 1606A, 1606B in a project 1604.

The code management system 1600 includes a user test case generation system 1616. The controller 1612 analyzes a source code repository 1602A-1602B to detect focal methods 1614 that have not been tested (i.e., no associated unit test case found) or have been under-tested (i.e., testing and coverage criteria are not satisfactory). Upon detection of such focal methods, the controller 1612 invokes the unit test case generation system 1616 with the focal method 1614 as input. The unit test case generation system produces at most k unit test cases 1618 for the given focal method 1614. The controller 1612 integrates the unit test cases 1618 into the respective source code repository 1602A, 1602B, thus improving the project by reaching a satisfactory testing coverage.

Variations

It should be noted that the unit test case generation system is not limited to having the focal method as the sole input to the neural transformer model with attention to predict unit test case candidates or to fine-tune the neural transformer model with attention. Additional data representing the context of the focal method's class may be included with the focal method during the training and inference of the neural transformer model with attention. In particular, the input to the model, along with the focal method may include one or more of the following: (1) class constructor—the class name and constructor will inform the model on the expected installation of the class; (2) class attributes—the public class attributes will allow the model to generate unit test cases that can inspect and assert the value of the object's attributes; and (3) methods' signatures—the list of public methods' signatures in the focal class may be used by the model to setup the testing environment and inspect the result (e.g., using getters and setters).

Exemplary Operating Environment

Figure 15:
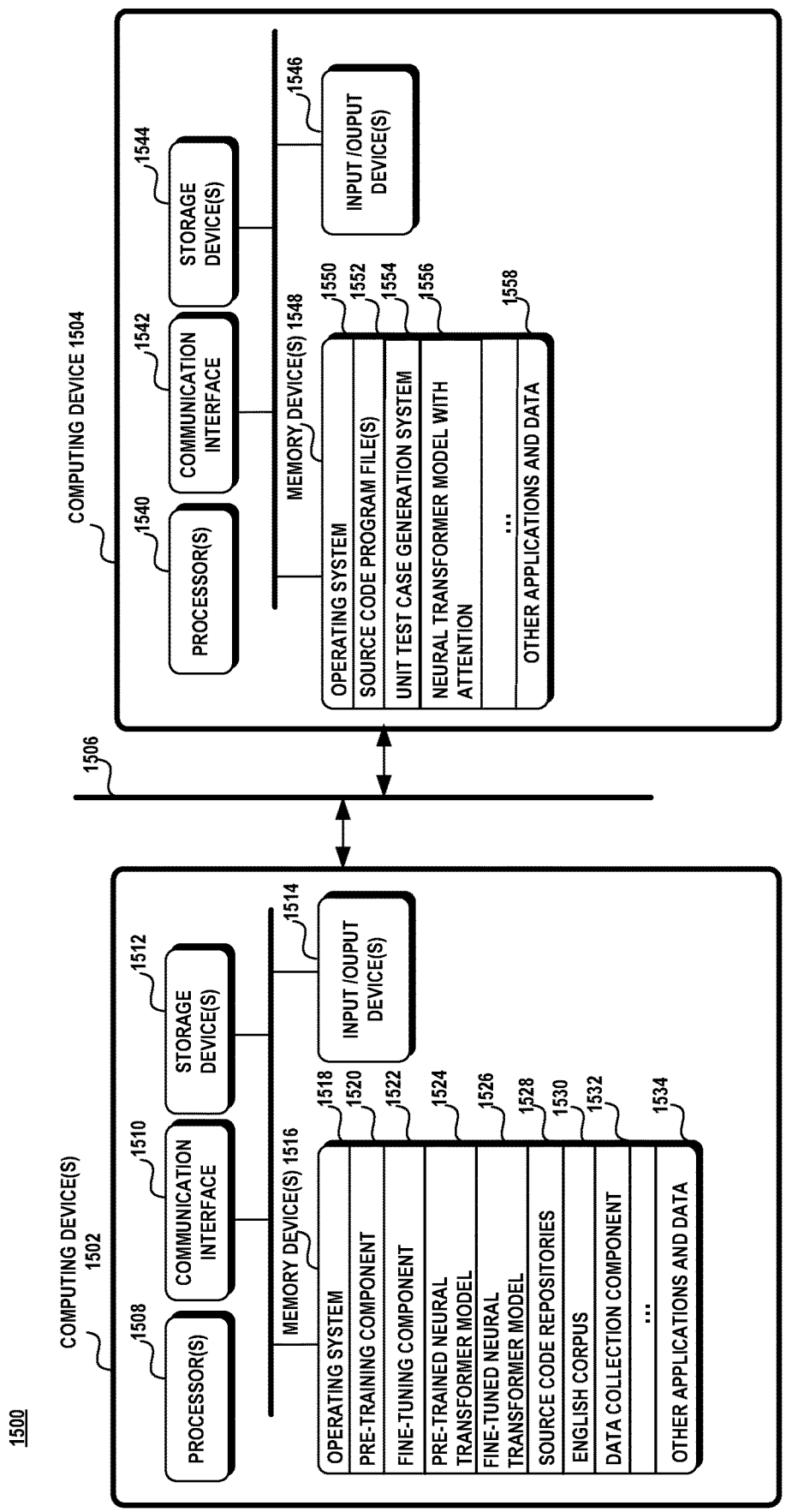
FIG. 15 is a block diagram illustrating an operating environment.

Attention now turns to a discussion of an exemplary operating environment. FIG. 15 illustrates an exemplary operating environment 1500 in which one or more computing devices 1502 are used to train the neural transformer model and a second computing device 1504 uses the neural transformer model with attention for unit test case generation. However, it should be noted that the aspects disclosed herein is not constrained to any particular configuration of devices. Any one of the computing devices 1502, 1504 may utilize the neural transformer model in its own unit test case generation system and computing device 1504 may generate and test the neural transformer model with attention as well. Computing devices 1502 may be configured as a cloud service that generates the neural transformer model as a service for other code completion systems. It should be noted that the operating environment is not limited to any particular configuration and other configurations are possible.

The computing devices 1502, 1504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1500 may be configured in a network environment, a distributed environment, a multi-processor environment, or a stand-alone computing device having access to remote or local storage devices.

The computing devices 1502, 1504 may include one or more processors 1508, 1540, one or more communication interfaces 1510, 1542, one or more storage devices 1512, 1544, one or more input/output devices 1514, 1546, and one or more memory devices 1516, 1548. A processor 1508, 1540 may be any commercially available or customized processor and may include dual microprocessors and multi-processor architectures. A communication interface 1510, 1542 facilitates wired or wireless communications between the computing device 1502, 1504 and other devices. A storage device 1512, 1544 may be computer-readable medium that does not contain propagating signals, such as modulated data signals transmitted through a carrier wave. Examples of a storage device 1512, 1544 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1512, 1544 in the computing devices 1502, 1504. The input/output devices 1514, 1546 may include a keyboard, mouse, pen, voice input device, touch input device, display, speakers, printers, etc., and any combination thereof.

A memory device 1516, 1548 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1516, 1548 may also include one or more external storage devices or remotely located storage devices that do not pertain to propagated signals, such as modulated data signals transmitted through a carrier wave.

Computing device 1504 may utilize a source code development tool 1554 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The source code development tool 1554 may provide a native code development environment or may provide a managed code development that runs on a virtual machine or may provide a combination thereof. The source code development tool 1554 may provide a managed code development environment using the .NET framework. It should be noted that this operating embodiment is not constrained to providing the source code development services through any particular source code development tools and that other tools may be utilized instead, such as a stand-alone source code editor, IDE, browser and the like.

The memory device 1548 of computing device 1504 may contain instructions, components, and data. A component is a software program that performs a specific function and is otherwise known as a module, program, component, and/or application. The memory device 1548 may include an operating system 1550, one or more source code program files 1552, a unit test case generation system 1554, a neural transformer model with attention 1556 and other applications and data 1558.

The memory device 1516 of the computing devices 1502 may include an operating system 1518, a pre-training component 1520, a fine-tuning component 1522, a pre-trained neural transformer model 1524, a fine-tuned neural transformer model 1526, source code repositories 1528, English corpus 1530, a data collection component 1532, and other applications and data 1534.

The computing devices 1502, 1504 may be communicatively coupled via a network 1506. The network 1506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores one or more programs that are configured to be executed by the one or more processors, the one or more programs including instructions that: pre-train the neural transformer model with attention with a first unsupervised training dataset, the first unsupervised training dataset including a plurality of sequences of natural language; pre-train a neural transformer model with attention with a second unsupervised training dataset, the second unsupervised training dataset including a plurality of sequences of source code from source code methods of a programming language; fine-tune the neural transformer model with attention with a supervised training dataset, the supervised dataset including mapped unit test case pairs, a mapped unit test case pair includes a focal method and an associated unit test case; and deploy the neural transformer model with attention in a unit test case generation system to predict a unit test case for a target method.

In one aspect, the neural transformer model with attention is pre-trained with the first unsupervised training dataset before being pre-trained with the second unsupervised training dataset. In one aspect, the one or more programs include further instructions that: mine a source code repository for a plurality of unit test classes, a unit test class includes a unit test case; find a focal class for each test class, a focal class represents a class of the test class under test; identify a corresponding focal method within the focal class; and match a unit test case name with a name of a focal method within the focal class to generate a mapped unit test case pair.

In one aspect, the one or more programs include further instructions that: apply a span mask to sequences of the first unsupervised training dataset; and wherein the pre-trained neural transformer model with attention is trained to learn semantics of the natural language by replacing the span mask in a sequence with appropriate words of the natural language.

In one aspect, the one or more programs include further instructions that: apply a span mask to sequences of the second unsupervised training dataset; and wherein the pre-trained neural transformer model with attention is trained to learn syntax of a programming language of the source code methods by replacing the span mask of a sequence with appropriate source code. In one aspect, fine-tune the neural transformer model with attention with a supervised training dataset is a translation task with a training objective that learns a mapping of a focal method to a unit test case, $mi \rightarrow ti_c$, as a conditional probability $P(ti_c, mi)$. In one aspect, the natural language is English and the source code is written in Java programming language.

A method is disclosed that is performed by one or more computing devices, the method comprising: pre-training a neural transformer model with attention with a first unsupervised training dataset, the first unsupervised training dataset including a plurality of sequences of natural language text; pre-training the neural transformer model with attention with a second unsupervised training dataset, the second unsupervised training dataset including a plurality of sequences of source code; fine-tuning the neural transformer model with attention with a supervised training dataset, the supervised dataset including mapped unit test case pairs, a mapped unit test case pair including a focal method and an associated unit test case; and deploying the neural transformer model with attention to automatically predict a unit test case for a given method.

In one aspect, the method further comprises: mining a source code repository for a plurality of unit test classes, a unit test class includes a unit test case; finding a focal class for each unit test class, a focal class represents a class of the unit test class; identifying a corresponding focal method within the focal class; and matching a unit test case name with a name of a focal method within the focal class. In another aspect, the method further comprises: generating a mapped unit test case pair as the focal method and the matched unit test case name. In another aspect, the method further comprises: applying a span mask to sequences of the second unsupervised training dataset; and wherein the pre-trained neural transformer model with attention is trained to learn syntax of a programming language of the source code methods by replacing the span mask of a sequence with appropriate source code. In one aspect, the method further comprises: applying a span mask to sequences of the first unsupervised training dataset; and the pre-trained neural transformer model with attention is trained to learn semantics of the natural language by replacing the span mask in a sequence with appropriate words of the natural language.

In another aspect, the neural transformer model with attention includes at least one encoder block having a Gaussian Error Linear Unit activation function (GELU) and at least one decoder block having a GELU. In an aspect, the mapped unit test case pair further includes a focal method context, the focal method context includes a class constructor, class attributes or focal class methods' signatures of a focal class of the focal method. In another aspect, the natural language is English and the source code is written in Java programming language.

A device is disclosed comprising: at least one processor and a memory. The at least one processor is configured to: translate an input sequence to an output sequence using a neural transformer model with attention, the input sequence including a sequence of subtokens representing a focal method of a source code program written in a programming language, the output sequence representing a sequence of subtokens representing a unit test case for the focal method, wherein the translation performs a beam search that generates each subtoken in the output sequence of subtokens, one at a time at each timestep, wherein the beam search selects top k subtokens at a timestep based on an output distribution generated by the neural transformer model with attention, the output distribution generated for each subtoken in a vocabulary of the neural transformer model with attention, wherein the top k subtokens instantiate k data paths that are iteratively processed until an end-of-method subtoken is predicted to complete the output sequence.

In an aspect, the neural transformer model with attention is pre-trained on English text, pre-trained on source code of the programming language and fine-tuned on mapped unit test case pairs, wherein a mapped unit test case pair includes a target method and a unit test case, the mapped unit test case pair obtained from historical usage data. In one aspect, the device includes a code management system that performs the translation for a method of a source code file of a source code repository automatically. In one or more aspects, the neural transformer model with attention includes at least one encoder block with a Gaussian Error Linear Unit (GeLU) activation function and at least one decoder block with a GeLU. In an aspect, the input sequence further includes context data of a focal class of the focal method, wherein the context data includes class constructor, class attributes, and/or method signatures of methods of the focal class.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
a memory that stores one or more programs that are configured to be executed by the one or more processors, the one or more programs including instructions to perform actions that:
pre-train a first neural transformer model with attention with a first unsupervised training dataset to learn semantic relationships of a natural language, the first unsupervised training dataset comprising a plurality of sequences of the natural language;
pre-train the first neural transformer model with attention with a second unsupervised training dataset to learn syntax of a programming language and se mantic relationships of code elements of the programming language, the second unsupervised training dataset comprising a plurality of sequences of source code from source code methods of the programming language;
fine-tune the first neural transformer model with attention with a supervised training dataset to learn to generate a unit test case fora given focal method written in the programming language, wherein the supervised dataset comprises mapped unit test case pairs, wherein a mapped unit test case pair of the mapped unit test case pairs includes a focal method and an associated unit test case written in the programming language, wherein fine-tuning the first neural transformer model with attention with the supervised training dataset is a translation task with a training objective that learns a mapping of a focal method to a unit test case, $fm_i \rightarrow tc_i$, as a conditional probability $P(tc_i, fm_i)$; and
deploy the first neural transformer model with attention in a unit test case generation system to predict a unit test case fora target method of a source code program.

2. The system of claim 1, wherein the first neural transformer model with attention is pre-trained with the first unsupervised training dataset before being pre-trained with the second unsupervised training dataset.

3. The system of claim 1, wherein the one or more programs include further instructions to perform actions that:
mine a source code repository for a plurality of unit test classes, wherein a unit test class includes a unit test case;
find a focal class for each test class, wherein a focal class represents a class of the test class under test;
identify a corresponding focal method within the focal class; and
match a unit test case name with a name of the corresponding focal method within the focal class to generate a mapped unit test case pair.

4. The system of claim 1, wherein the one or more programs include further instructions to perform actions that: apply a span mask to the sequences of the first unsupervised training dataset; and wherein the pre-trained first neural transformer model with attention is trained to learn the semantic relationships of the natural language by replacing the span mask in a sequence with appropriate words of the natural language.

5. The system of claim 1, wherein the one or more programs include further instructions to perform actions that:
apply a span mask to the sequences of the second unsupervised training dataset; and
wherein the pre-trained first neural transformer model with attention is trained to learn the syntax of the programming language of the source code methods by replacing the span mask of a sequence with appropriate source code.

6. The system of claim 1, wherein the natural language is English and the source code is written in Java programming language.

7. A method performed by one or more computing devices, comprising:
pre-training a neural transformer model with attention with a first unsupervised training dataset comprising a plurality of sequences of natural language text to learn semantic relationships of a natural language;
pre-training the neural transformer model with attention with a second unsupervised training dataset comprising a plurality of sequences of source code to learn syntax of a programming language and semantic relationships of code elements of the programming language;
fine-tuning the neural transformer model with attention with a supervised training dataset to learn to generate a unit test case fora given focal method written in the programming language, wherein the supervised dataset comprises mapped unit test case pairs, wherein a mapped unit test case pair of the mapped unit test case pairs comprises a first focal method and an associated unit test case written in the programming language, wherein fine-tuning the neural transformer model with attention with the supervised training dataset is a translation task with a training objective that learns a mapping of a focal method to a unit test case, $fm_i \rightarrow tc_i$, as a conditional probability $P(tc_i, fm_i)$; and
deploying the neural transformer model with attention to automatically predict a unit test case fora given target method of a source code program.

8. The method of claim 7, further comprising:
mining a source code repository for a plurality of unit test classes, wherein a unit test class includes a unit test case;
finding a focal class for each unit test class, wherein a focal class represents a class of the unit test class;

identifying a corresponding focal method within the focal class; and matching a unit test case name with a name of the corresponding focal method within the focal class.

9. The method of claim 8, further comprising: generating a mapped unit test case pair as the corresponding focal method and the matched unit test case name.

10. The method of claim 7, further comprising: applying a span mask to the sequences of the second unsupervised training dataset; and wherein the pre-trained neural transformer model with attention is trained to learn the syntax of the programming language of the source code methods by replacing the span mask of a sequence with appropriate source code.

11. The method of claim 7, further comprising: applying a span mask to the sequences of the first unsupervised training dataset; and wherein the pre-trained neural transformer model with attention is trained to learn the semantic relationships semantics of the natural language by replacing the span mask in a sequence with appropriate words of the natural language.

12. The method of claim 7, wherein the neural transformer model with attention includes at least one encoder block having a Gaussian Error Linear Unit activation function (GELU) and at least one decoder block having a GELU.

13. The method of claim 7, wherein the mapped unit test case pair further includes a focal method context, wherein the focal method context comprises a class constructor, class attributes or focal class methods' signatures of a focal class of the first focal method.

14. The method of claim 7, wherein the natural language is English and the source code is written in Java programming language.

\* \* \* \* \*